(12) United States Patent
Flowers et al.

(10) Patent No.: US 9,575,845 B2
(45) Date of Patent: Feb. 21, 2017

(54) TRANSFER OF USER DATA BETWEEN LOGICAL DATA SITES

(71) Applicant: Carbonite, Inc., Boston, MA (US)

(72) Inventors: Jeffry C. Flowers, Marblehead, MA (US); Jonathan F. Freidin, Marblehead, MA (US); Chaitanya K. Godsay, Lexington, MA (US)

(73) Assignee: Carbonite, Inc., Newton, MA (US)

( * ) Notice: Subject to any disclaimer, the term of this patent is extended or adjusted under 35 U.S.C. 154(b) by 0 days.

(21) Appl. No.: 14/335,676

(22) Filed: Jul. 18, 2014

(65) Prior Publication Data

US 2014/0351221 A1    Nov. 27, 2014

Related U.S. Application Data

(63) Continuation of application No. 13/637,540, filed as application No. PCT/US2010/028942 on Mar. 26, 2010, now Pat. No. 8,818,956.

(51) Int. Cl.
*G06F 7/04* (2006.01)
*G06F 17/30* (2006.01)
(Continued)

(52) U.S. Cl.
CPC ....... *G06F 11/1464* (2013.01); *G06F 11/1448* (2013.01); *G06F 11/1456* (2013.01);
(Continued)

(58) Field of Classification Search
CPC ............ G06F 17/30575; G06F 11/1446; G06F 11/1448; G06F 3/0655
See application file for complete search history.

(56) References Cited

U.S. PATENT DOCUMENTS

| 7,024,528 B2 | 4/2006 | LeCrone et al. |
| 8,706,960 B1 * | 4/2014 | Ives ...................... G06F 3/0617 711/114 |

(Continued)

FOREIGN PATENT DOCUMENTS

WO    WO-2007/029912 A1    3/2007

OTHER PUBLICATIONS

International Search Report on PCT/US2010/028942 dated Dec. 22, 2010.

(Continued)

*Primary Examiner* — Bruce Moser
(74) *Attorney, Agent, or Firm* — Foley & Lardner LLP; Daniel Rose

(57) ABSTRACT

The present application is directed to systems and methods for transferring data between data backup sites. Backup data for transferring from a source data backup site to a destination data backup site is determined based on a storage parameter, the backup data comprising data associated with a client device. A transfer parameter is received from the destination data backup site, the transfer parameter comprising a storage logical site available for data storage. The determined backup data is matched to the storage logical site based on a parameter selected from a group consisting of the storage parameter, and the transfer parameter. A transfer of the determined backup data to the storage logical site is scheduled based on a parameter selected from a group consisting of the storage parameter, the transfer parameter, and a schedule parameter.

19 Claims, 17 Drawing Sheets

(51) Int. Cl.
  *G06F 11/14* (2006.01)
  *H04L 29/08* (2006.01)

(52) U.S. Cl.
  CPC .... *G06F 11/1461* (2013.01); *G06F 17/30575* (2013.01); *H04L 67/32* (2013.01); *G06F 11/1466* (2013.01); *G06F 2201/84* (2013.01)

(56) References Cited

U.S. PATENT DOCUMENTS

| | | | |
|---|---|---|---|
| 2003/0131278 A1* | 7/2003 | Fujibayashi | G06F 11/1469 714/6.3 |
| 2003/0200275 A1 | 10/2003 | Hirabayashi et al. | |
| 2003/0225800 A1* | 12/2003 | Kavuri | G06F 11/1448 |
| 2004/0073677 A1 | 4/2004 | Honma et al. | |
| 2006/0064444 A1 | 3/2006 | Van Ingen et al. | |
| 2007/0185939 A1 | 8/2007 | Prahland et al. | |
| 2008/0162846 A1* | 7/2008 | Kodama | G06F 11/1456 711/162 |
| 2008/0294859 A1 | 11/2008 | Nguyen | |
| 2009/0164530 A1* | 6/2009 | Gilpin | G06F 11/1464 |
| 2009/0204650 A1 | 8/2009 | Wong et al. | |
| 2009/0226842 A1* | 9/2009 | Shimizu | G03F 7/0045 430/281.1 |
| 2011/0004459 A1* | 1/2011 | Collins | G06F 3/0605 703/24 |
| 2011/0060722 A1 | 3/2011 | Li et al. | |
| 2011/0161297 A1* | 6/2011 | Parab | G06F 11/1453 707/646 |
| 2012/0078852 A1 | 3/2012 | Haselton et al. | |

OTHER PUBLICATIONS

Notice of Allowance on U.S. Appl. No. 13/637,540 dated Jun. 6, 2014.
Office Action on U.S. Appl. No. 13/637,540 dated Jan. 13, 2014.
Office Action on U.S. Appl. No. 14/445,863 dated Apr. 10, 2015.
Office Action in US App No. 4/445,863 dated Oct. 9, 2015,
Office Action on U.S. Appl. No. 14/445,863 dated Apr. 19, 2016.

* cited by examiner

TRANSFER OF USER DATA BETWEEN LOGICAL DATA SITES

RELATED APPLICATIONS

The present application claims priority to and is a continuation of co-pending U.S. patent application Ser. No. 13/637,540, entitled "Transfer of User Data Between Logical Sites," filed Sep. 26, 2012; which is a national phase entry under 35 U.S.C. §371 of International Application No. PCT/US2010/028942, entitled "Transfer of User Data Between Logical Data Sites," filed Mar. 26, 2010 and designating the United States, each of which are hereby incorporated by reference in their entirety.

FIELD OF THE INVENTION

The present invention relates generally to computer-based methods and apparatuses, including computer program products, for transferring user data backup between logical data sites.

BACKGROUND

Computer systems are ubiquitous in today's work and home environments. The data stored on these computer systems, however, is vulnerable to theft, fire, flood, and other natural disasters. A data storage system is needed to support a backup and restore system for a large number of client computing devices. Multiple data centers may be employed to store user data backups.

One approach to managing backup data across multiple data centers is to preserve locality of user data backup in one logical data site in a data center. Over time, backup data for existing users continues to grow. In order to relieve space pressure, user data backup needs to be transferred to another logical data site. The transfer of user data backup between logical data sites must be performed with minimal interruption to data backup and restore processes, and without overloading network bandwidth. Thus, a need exists in the art for improved transfer of user data backup between logical data sites.

SUMMARY

One approach to transferring data between data backup sites is a method. The method includes determining backup data for transferring from a source data backup site to a destination data backup site based on a storage parameter, the backup data comprising data associated with a client device. The method further includes receiving a transfer parameter from the destination data backup site, the transfer parameter comprising a storage logical site available for data storage. The method further includes matching the determined backup data to the storage logical site based on a parameter selected from a group consisting of the storage parameter, and the transfer parameter. The method further includes scheduling a transfer of the determined backup data to the storage logical site based on a parameter selected from a group consisting of the storage parameter, the transfer parameter, and a schedule parameter.

Another approach to transferring data between data backup sites is a method. The method includes determining source data backup sites associated with a destination data backup site. The method further includes allocating available network bandwidth to the source data backup sites based on storage parameters associated with the source data backup sites. The method further includes generating an order of priority for data transfer from the source data backup sites to the destination data backup site based on the storage parameters. The method further includes scheduling transfer jobs to transfer backup data from the source data backup sites to the destination data backup site based on the order of priority.

Another approach to transferring data between data backup sites is a system. The system includes a destination site scheduler module and a source site scheduler module. The destination site scheduler module is configured to determine a source data backup site associated with a destination data backup site. The destination site scheduler module is configured to allocate network bandwidth to the source data backup site. The source site scheduler module is configured to determine backup data for transferring from a source data backup site to a destination data backup site based on a storage parameter, the backup data comprising data associated with a client device. The source site scheduler module is configured to receive a transfer parameter from the destination data backup site, the transfer parameter comprising a storage logical site available for data storage. The source site scheduler module is configured to match the determined backup data to the storage logical site based on a parameter selected from a group consisting of the storage parameter, and the transfer parameter. The source site scheduler module is configured to schedule a transfer of the determined backup data to the storage logical site based on a parameter selected from a group consisting of the storage parameter, the transfer parameter, and a schedule parameter.

Another approach to transferring data between data backup sites is a system. The system includes a source site scheduler module and a user data backup transfer module. The source site scheduler module is configured to determine backup data for transferring from a source data backup site to a destination data backup site based on a storage parameter, the backup data comprising data associated with a client device. The source site scheduler module is configured to receive a transfer parameter from the destination data backup site, the transfer parameter comprising a storage logical site available for data storage. The source site scheduler module is configured to match the determined backup data to the storage logical site based on a parameter selected from a group consisting of a storage parameter, and a transfer parameter. The source site scheduler module is configured to schedule a transfer of the determined backup data to the storage logical site based on a parameter selected from a group consisting of the storage parameter, the transfer parameter, and a schedule parameter. The user data backup transfer module is configured to transfer backup data from the source data backup site to the destination data backup site.

Another approach to transferring data between data backup sites is a computer software product. The computer software product includes a non-transitory computer readable medium. The non-transitory computer readable medium includes a set of processor executable instructions that when executed by a processor configure a computing apparatus to determine backup data for transferring from a source data backup site to a destination data backup site based on a storage parameter, the backup data comprising data associated with a client device. The computing apparatus is configured to receive a transfer parameter from the destination data backup site, the transfer parameter comprising a storage logical site available for data storage. The computing apparatus is configured to match the determined backup data to the storage logical site based on a parameter selected from a group consisting of the storage parameter, and the transfer parameter. The computing apparatus is configured to schedule a transfer of the determined backup data to the storage logical site based on a parameter selected from a group consisting of the storage parameter, the transfer parameter, and a schedule parameter.

Another approach to transferring data between data backup sites is a computer software product. The computer software product includes a non-transitory computer readable medium. The non-transitory computer readable medium includes a set of processor executable instructions that when executed by a processor configure a computing apparatus to determine source data backup sites associated with a destination data backup site. The computing apparatus is configured to allocate available network bandwidth to the source data backup sites based on storage parameters associated with the source data backup sites. The computing apparatus is configured to generate an order of priority for data transfer from the source data backup sites to the destination data backup site based on the storage parameters. The computing apparatus is configured to schedule transfer jobs to transfer backup data from the source data backup sites to the destination data backup site based on the order of priority.

Another approach to transferring data between data backup sites is a system. The system includes a means for determining backup data for transferring from a source data backup site to a destination data backup site based on a storage parameter, the backup data comprising data associated with a client device. The system includes a means for receiving a transfer parameter from the destination data backup site, the transfer parameter comprising a storage logical site available for data storage. The system includes a means for matching the determined backup data to the storage logical site based on a parameter selected from a group consisting of a storage parameter, and a transfer parameter. The system includes a means for scheduling a transfer of the determined backup data to the storage logical site based on a parameter selected from a group consisting of the storage parameter, the transfer parameter, and a schedule parameter.

Another approach to transferring data between data backup sites is a system. The system includes a means for determining source data backup sites associated with a destination data backup site. The system includes a means for allocating available network bandwidth to the source data backup sites based on storage parameters associated with the source data backup sites. The system includes a means for generating an order of priority for data transfer from the source data backup sites to the destination data backup site based on the storage parameters. The system includes a means for scheduling transfer jobs to transfer backup data from the source data backup sites to the destination data backup site based on the order of priority.

The transfer of user data backup between logical data sites techniques described herein can provide one or more of the following advantages. An advantage to transferring user data between logical data sites is the strategic utilization of available network bandwidth during the transfer process, thereby minimizing network bandwidth costs while increasing the efficiency of the backup and restoration process. Another advantage to transferring user data between logical data sites is the ability to preserve the locality of user data on one storage volume, thereby increasing restore performance administrative efficiency and maintenance of user data.

Other aspects and advantages of the present invention will become apparent from the following detailed description, taken in conjunction with the accompanying drawings, illustrating the principles of the invention by way of example only.

BRIEF DESCRIPTION OF THE DRAWINGS

Various embodiments taught herein are illustrated by way of example, and not by way of limitation, in the figures of the accompanying drawings, in which.

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Figure 1:
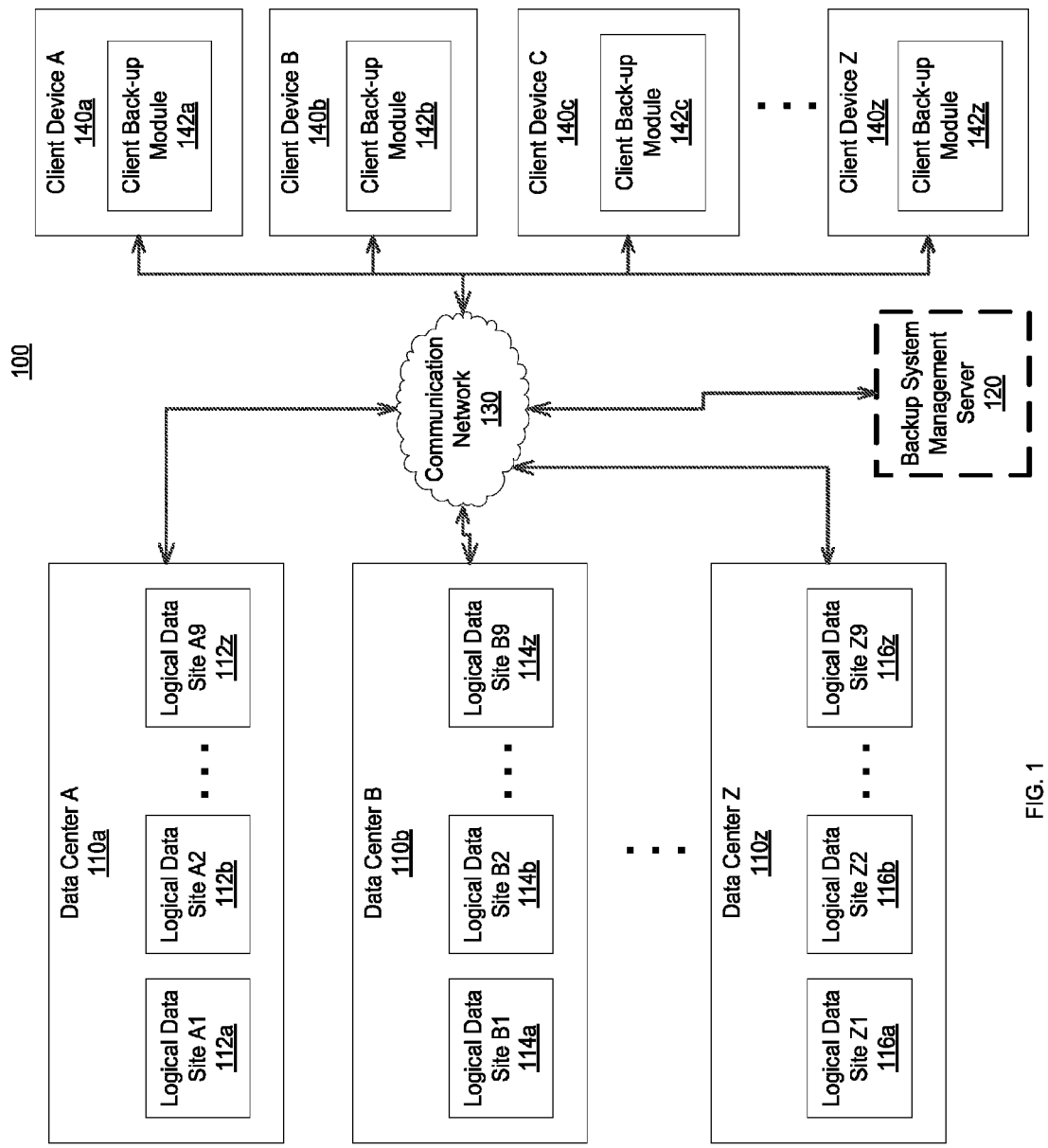
FIG. 1 is a block diagram illustrating an exemplary system, according to one exemplary embodiment.

FIG. 1 illustrates an exemplary system 100 for backup and restoration of user data (e.g., one or more document files, one or more audio files, etc.) between client devices A 140a, B 140b, C 140c through Z 140z (e.g., personal computer, server computing system, personal digital assistant, phone, music player, etc.) and data centers A 110a, B 110b through Z 110z (e.g., server systems with a plurality of data storage devices, server systems connected to a plurality of network data storage devices, etc.). The system 100 includes a communication network 130 (e.g., internet protocol (IP) network, a local area network (LAN), internet, etc.) and a backup system management server 120.

Each data center A 110a, B 110b through Z 110z includes a plurality of logical data sites 1, 2 through 9, 112a, 112b through 112z, 114a, 114b through 114z, and 116a, 116b, through 116z, respectively. Each client device A 140a, B 140b, C 140c through Z 140z includes a client backup module 142a, 142b, 142c, through 142z, respectively. The data centers 110a-110z, the client devices 140a-140z, and/or the backup system management server 120 communicate via the communication network 130.

The backup system management server 120 can manage the backup of user data from the client devices 140a-140z to one or more of the logical data sites at one or more of the data centers 110a-110z. The backup system management server 120 can manage the restoration of user data from one or more of the logical data sites at one or more of the data centers 110a-110z to the client devices 140a-140z. The backup system management server 120 can communicate with the client backup module 142a-142z on each client device 140a-140z to manage the backup and/or restoration of the user data (e.g., pause backup, start backup, select backup set, start restoration, schedule backup, communicate a backup policy, update a backup set, etc.).

In some examples, the restoration of the user data is to the originating client device (e.g., the client device from which the user data originated from, the client device connected to the computing device which the user data originated from, etc.). In other examples, the restoration of the user data is to another client device that is not the originating client device (e.g., new user computer, etc.).

In other examples, each data center 110a-110z includes a data center management server (not shown) for managing the backup and/or the restoration of the user data. In some examples, each logical site includes a site management server for managing the backup and/or the restoration of the user data. In other examples, the backup system management server 120 manages the backup and/or the restoration of the user data by managing one or more of the data center management servers and/or one or more of the site management servers.

Although FIG. 1 illustrates a single communication network 130, the system can include a plurality of communication networks and/or the plurality of communication networks can be configured in a plurality of ways (e.g., a plurality of interconnected local area networks (LAN), a plurality of interconnected wide area network (WAN), a plurality of interconnected LANs and/or WANs, etc.).

Although FIG. 1 illustrates the data centers A 110a, B 110b through Z 110z, the logical data sites 1, 2 through 9 (e.g. 112a-112z), and the client device A 140a, B 140b, C 140c through Z 140z, the system 100 can include any number of data centers, logical data sites, and/or client devices. In some examples, data centers A, B, and C include ten logical data sites and data centers D, E, F, and G include twenty logical data sites. In other examples, ten thousand client devices are associated with each logical data site. In this example, data center G is associated with two hundred thousand client devices since data center G includes twenty logical data sites and each logical data site is associated with ten thousand client devices.

Figure 2:
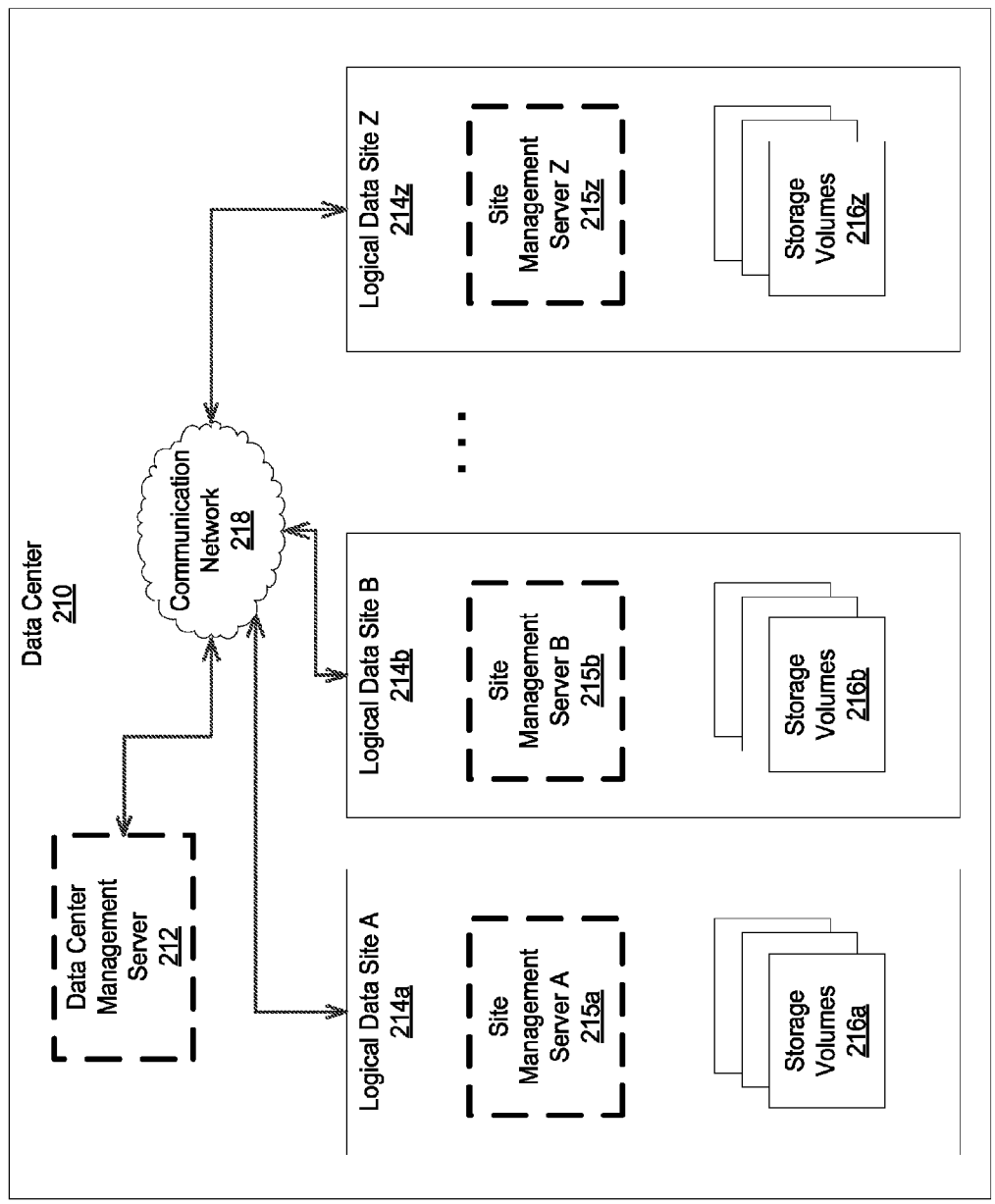
FIG. 2 is a block diagram illustrating an exemplary data center, according to one exemplary embodiment.

FIG. 2 illustrates an exemplary data center 210. The data center 210 includes a data center management server 212, logical data sites A 214a, B 214b through Z 214z, and a communication network 218. Each logical data site A 214a, B 214b through Z 214z includes a site management server A 215a, B 215b through Z 215z and one or more storage volumes 216a, 216b through 216z (e.g., logical storage volumes, storage devices, distributed storage devices, etc.). The data center management server 212 and/or the site manager servers 215a, 215b through 215z can manage the plurality of logical data sites 214a-214z.

Each logical data site A 214a, B 214b through Z 214z can store and/or retrieve the backup of user data associated with a plurality of users (e.g., subscribers to a backup subscription service, users in a corporate network, etc.). The storage volumes 216a-216z at each logical site 214a-214z can store and/or retrieve the backup of the user data.

In some examples, the backup of the user data is stored on a single storage volume (e.g., single storage device, single logical storage volume, redundant array of inexpensive disks (RAID) storage device, etc.). In other examples, the backup of the user data is stored on one or more storage volumes (e.g., distributed backup among a plurality of storage devices, redundant backup among a plurality of logical storage volumes, redundant backup among a plurality of RAID storage devices, etc.).

In some examples, the data center management server 212 manages the backup and/or the restoration for the data center 210 and the site manager server manages the storage and/or retrieval at the respective logical data site.

Although FIG. 2 illustrates a data center 210 with the logical data sites A 214a, B 214b through Z 214z, the data center 210 can include a single logical data site or any number of logical data sites (e.g., twenty, forty, one hundred, etc.). Although FIG. 2 illustrates the data center management server 212 and/or the site management server, the storage and/or retrieval of the backups of user data can be managed individually by either the data center management server 212 or the site management server at each respective logical site.

Figure 3A:
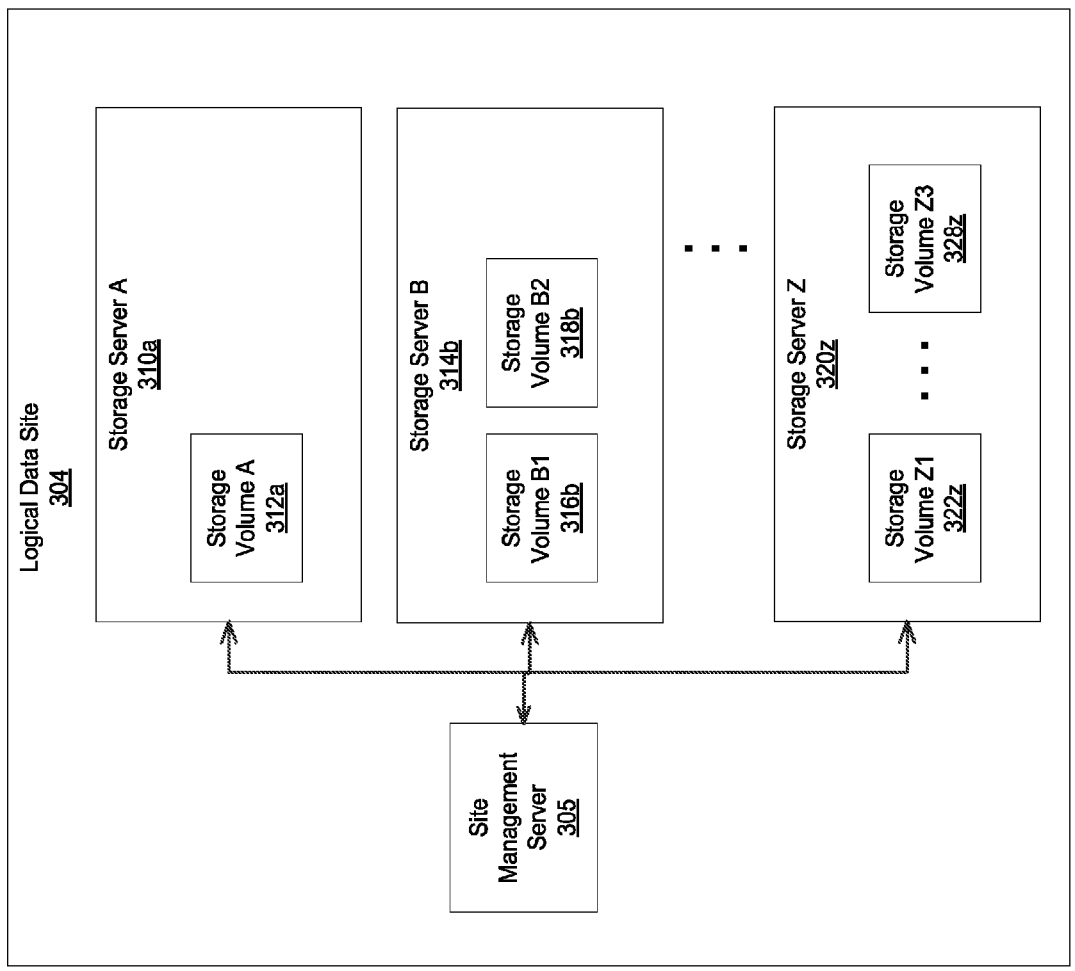
FIGS. 3A-3B are block diagrams illustrating exemplary logical data sites, according to one exemplary embodiment.

FIG. 3A illustrates a logical data site 304. The logical data site 304 includes a site management server 305 and storage server A 310a, B 314b through Z 320z. The storage server A 310a includes a storage volume A 312a. The storage server B 314b includes a storage volume B1 316b and a storage volume B2 318b. The storage server Z 320z includes a storage volumes Z1 322z through Z3 328z. Any number of storage volumes can be grouped within a storage server. Each storage volume includes a plurality of user data backup (not shown). The site management server 305 can communicate with the storage servers A 310a, B 314b through Z 320z to backup and/or restore the backup of the user data.

Although FIG. 3A illustrates storage servers A 310a, B 314b through Z 320z and storage volumes 312a, 316b, 318b, 322z through 328z, the logical data site 304 can include any number of storage servers and/or storage volumes. For example, the logical data site 304 can include four storage servers and each storage server includes forty storage volumes.

In some embodiments, the site management server 305 can include a database server and a server managing storage bandwidth resources for the logical data site 304. In these embodiments, the site management server 305 can control one or more communications servers that act as intermediary between client communication module 805 and the storage servers A 310a, B 314b through Z 320z.

Figure 3B:
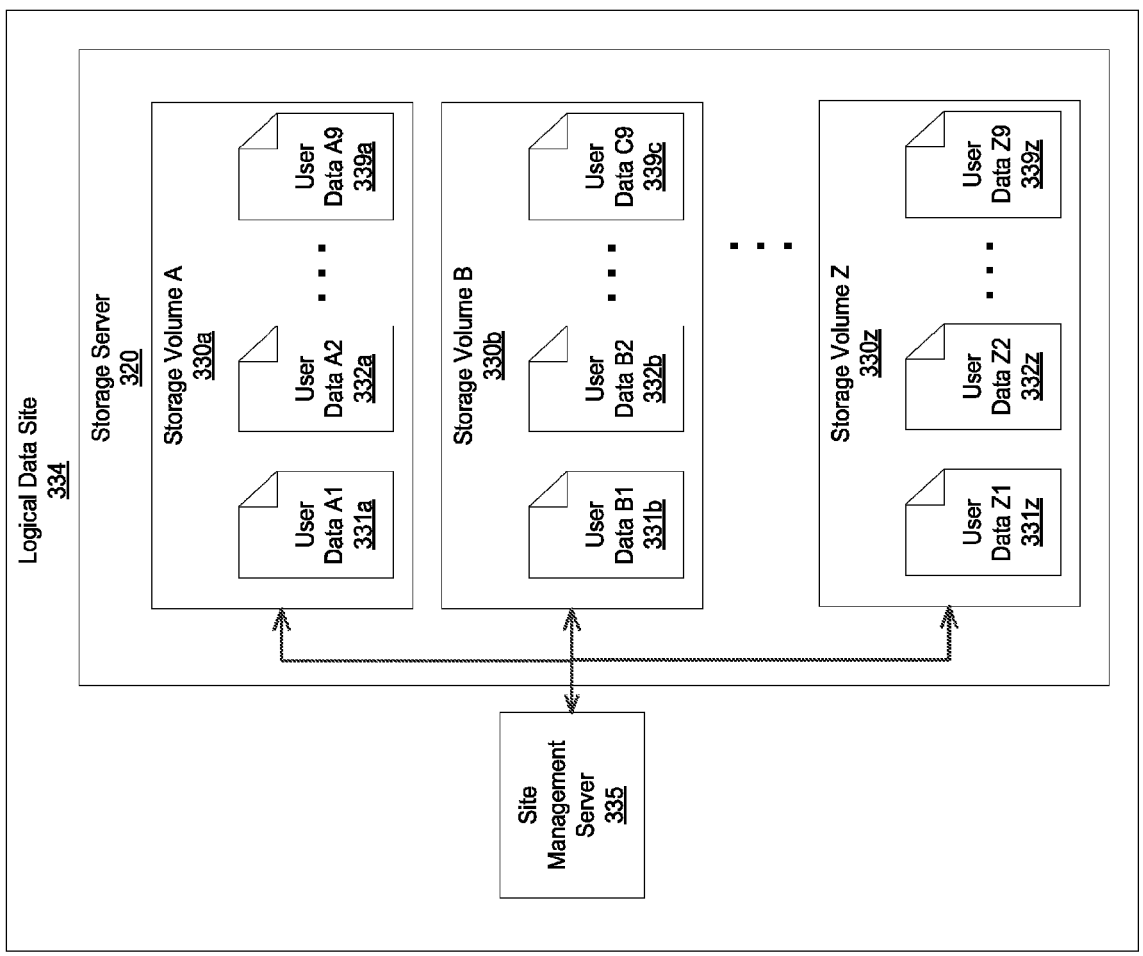

FIG. 3B illustrates a logical data site 334. The logical data site 334 includes a site management server 335 and a storage server 320. The storage server 320 includes storage volumes A 330a, B 330b through Z 330z. Each storage volume A 330*a*, B 330*b* through Z 330*z* includes plurality of user data 1, 2 through 9 (e.g., the user data is the backup of the user data stored on a client device associated with the user). The site management server 335 can communicate with the storage server 320 and/or the storage volumes A 330*a*, B 330*b* through Z 330*z* to backup and/or restore the backup of the user data.

In some examples, the site management server 335 can communicate with the storage volumes to transfer user data between the storage volumes. In some examples, the site management server 335 can communicate with one or more site management servers (not shown) at one or more other logical data sites (not shown) to transfer user data between the logical data sites.

Although FIG. 3B illustrates storage volumes A 330*a*, B 330*b* through Z 330*z* and user data 1, 2 through 9, the logical data site 334 can include any number of storage volumes and/or user data. For example, the logical data site 334 can include twenty storage volumes and each storage volume includes user data associated with one thousand users.

Figure 4:
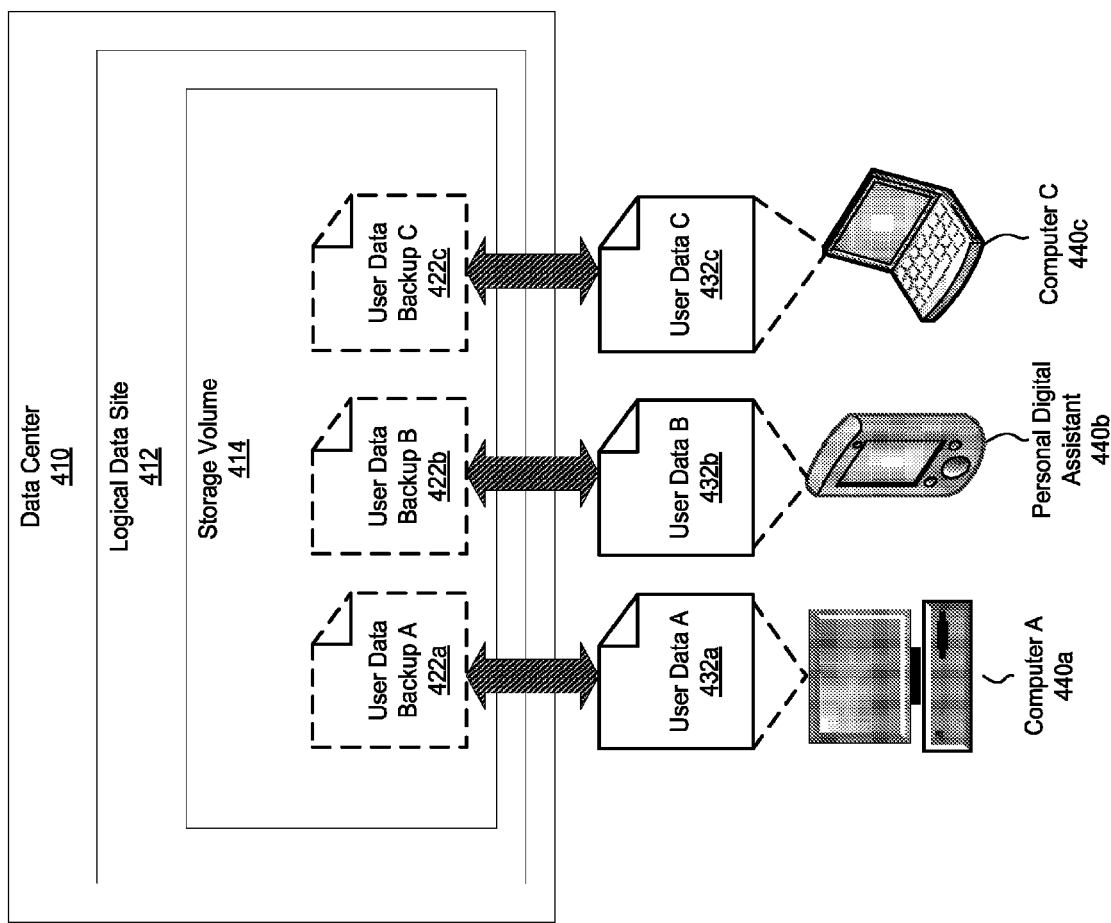
FIG. 4 is a block diagram illustrating an exemplary data center storing user data backup from client devices, according to one exemplary embodiment.

FIG. 4 illustrates an exemplary data center 410 for the backup of user data from one or more client devices 440*a*, 440*b*, and 440*c*. The data center 410 includes a logical data site 412. The logical data site 412 includes a storage volume 414. The storage volume 434 includes user data backups A 432*a*, B 432*b*, and C 432*c*. The user data backups A 422*a*, B 422*b*, and C 422*c* correspond to user data A 432*a*, B 432*b*, and C 432*c*, respectively. The user data A 432*a*, B 432*b*, and C 432*c* are stored on the client devices, computer A 440*a*, personal digital assistant 440*b*, and computer B 440*c*, respectively. As illustrated in FIG. 4, the user data A 432*a*, B 432*b*, and C 432*c* stored on the client devices is backed up to the storage volume 414 on the logical data site 412 in the data center 410.

Figure 5:
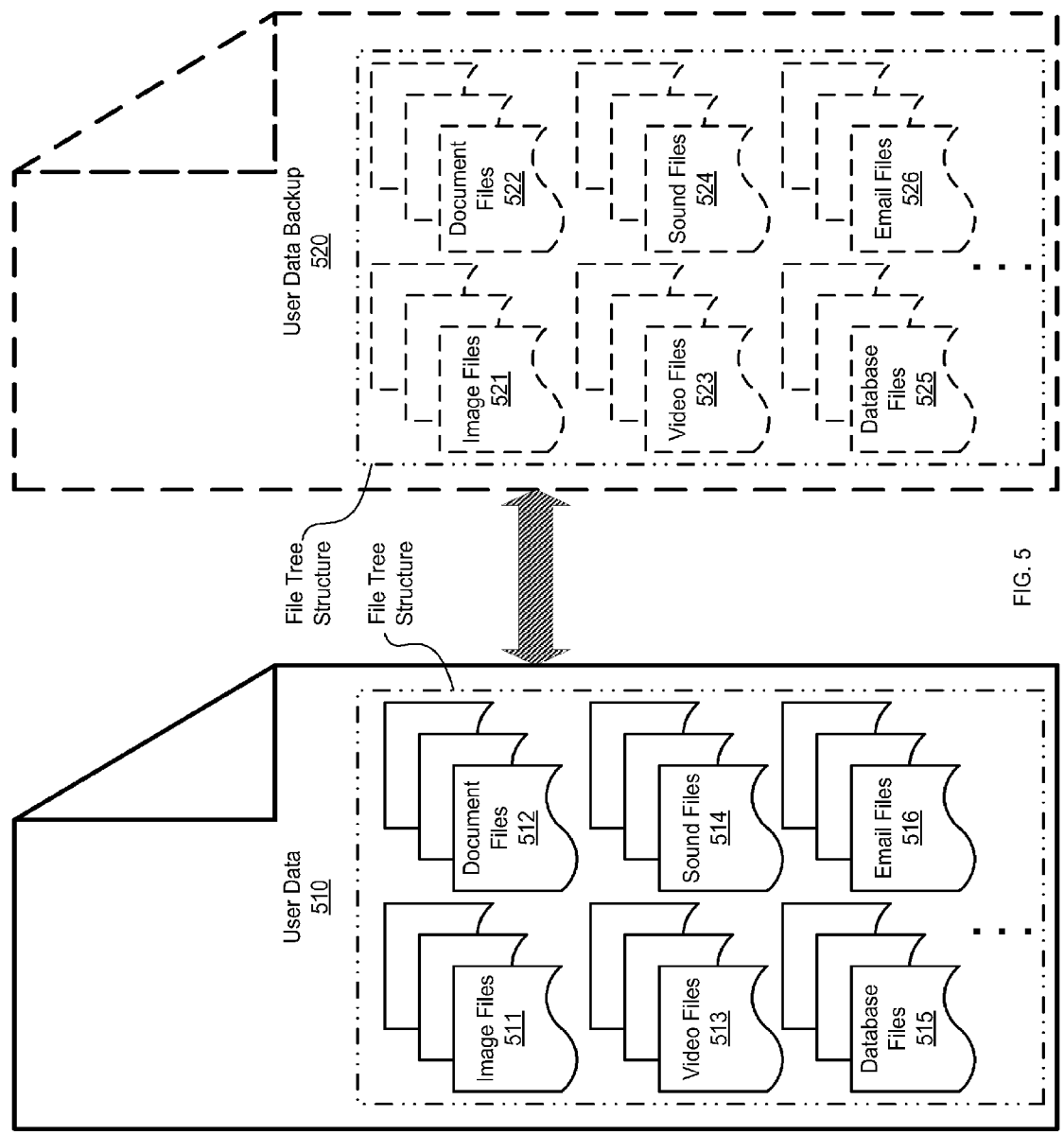
FIG. 5 illustrates exemplary user data and user data backup, according to one exemplary embodiment.

FIG. 5 illustrates exemplary user data 510 and user data backup 520. The user data 510 includes a plurality of files, image files 511, document files 512, video files 513, sound files 514, database files 515, and email files 516, and/or other information (e.g., registry information, user preference information, etc.) stored on a client device in a file tree structure (e.g., hierarchal database, hierarchal flat file, etc.). The user data backup 520 includes a plurality of files, image files 521, document files 522, video files 523, sound files 524, database files 525, and email files 526, and/or other information that is selected for backup by the user, automatically by the management server (e.g., site management server, data center management server, etc.), and/or based on backup templates and/or backup policies. The technology as described herein can be utilized to backup the user data as the user data backup.

Although FIG. 5 illustrates certain types of files (e.g., image files, document files, etc.), the technology as described herein can backup any type of information and/or data stored on the client device and/or a storage device connected to the client device (e.g., external storage device, network connected storage device, etc.).

Figure 6:
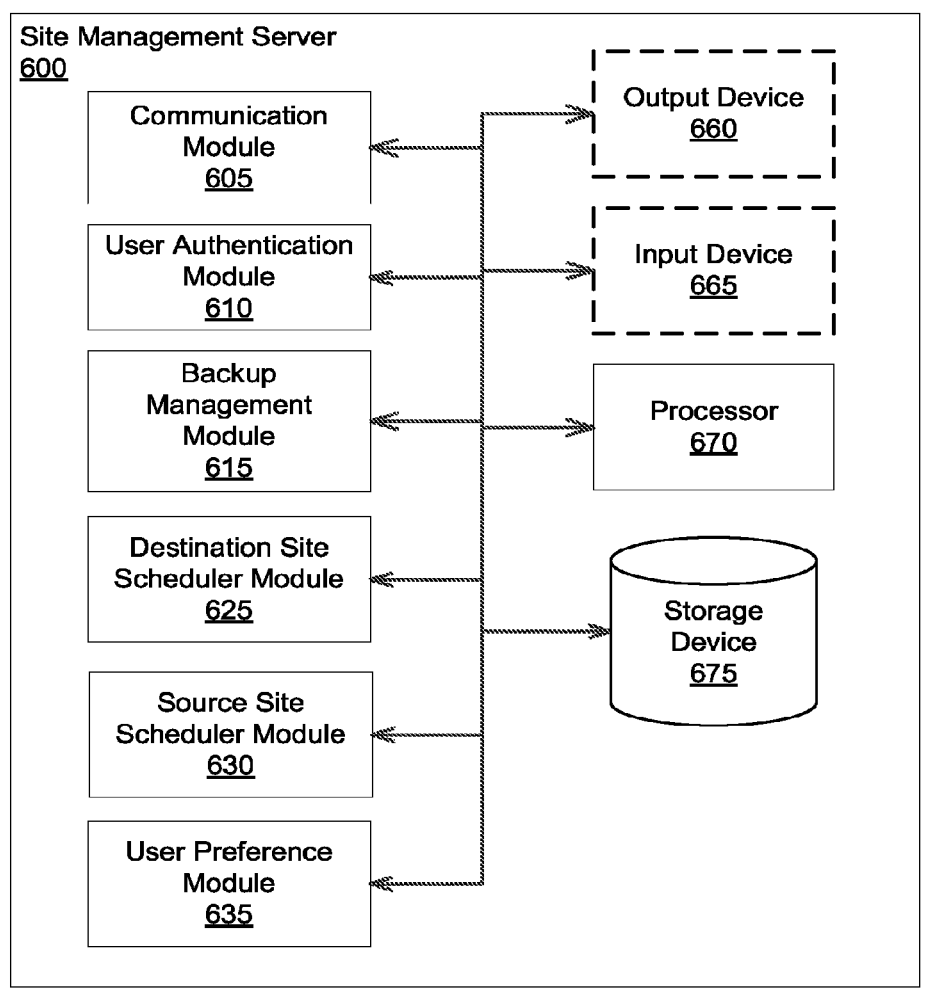
FIG. 6 is a block diagram illustrating an exemplary logical data site management server, according to one exemplary embodiment.

FIG. 6 illustrates an exemplary site management server 600. The site management server 600 includes a communication module 605, a user authentication module 610, a backup management module 615, a destination site scheduler module 625, a source site scheduler module 630, a user preference module 635, an output device 660, an input device 665, a processor 670, and a storage device 675. The modules and/or devices can be hardware and/or software. The modules and/or devices illustrated in the site management server 600 can, for example, utilize the processor 670 to execute computer executable instructions and/or include a processor to execute computer executable instructions (e.g., an encryption processing unit, a field programmable gate array processing unit, etc.). It should be understood that the site management server 600 can include, for example, other modules, devices, and/or processors known in the art and/or varieties of the illustrated modules, devices, and/or processors. It should be understood that the modules and/or devices illustrated in the site management server 600 can be located within the site management server 600 and/or connected to the site management server 600 (e.g., directly, indirectly, etc.), but outside of the physical components of the management server (e.g., personal computer, mobile device, etc.).

The communication module 605 communicates data to/from the site management server 600. The user authentication module 610 authenticates users to the site management server 600. The backup management module 615 manages and/or controls backups to/from the site management server 600.

The destination site scheduler module 625 schedules backups of user data and/or the transfer of user data between logical sites and/or data centers with respect to the site management server 600 as the destination of the transfer of the user data. The source site scheduler module 630 schedules backups of user data and/or the transfer of user data between logical sites and/or data centers with respect to the site management server 600 as the source of the transfer of the user data. The user preference module 635 manages preferences of users and/or collects information associated with user selections and/or preferences.

The output device 660 outputs information and/or data associated with the site management server 600 (e.g., information to a printer (not shown), information to a speaker, etc.). The input device 665 receives information associated with the site management server 600 (e.g., instructions from a user, instructions from a computing device, etc.) from a user (not shown) and/or a computing system (not shown). The input device 665 can include, for example, a keyboard, a scanner, an enrollment device, a scale, etc.

The processor 670 executes the operating system and/or any other computer executable instructions for the management server (e.g., executes applications, etc.). The site management server 600 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 675 stores the files, user preferences, backup sets, access information, an operating system and/or any other data associated with the site management server 600. The storage device can include a plurality of storage devices. The storage device 675 can include, for example, long-term storage (e.g., a hard drive, a tape storage device, flash memory, etc.), short-term storage (e.g., a random access memory, a graphics memory, etc.), and/or any other type of computer readable storage.

Although FIG. 6 illustrates the exemplary site management server 600, any of the management servers described herein (e.g., data center management server) can include the components and functionality described with respect to the site management server 600.

Figure 7:
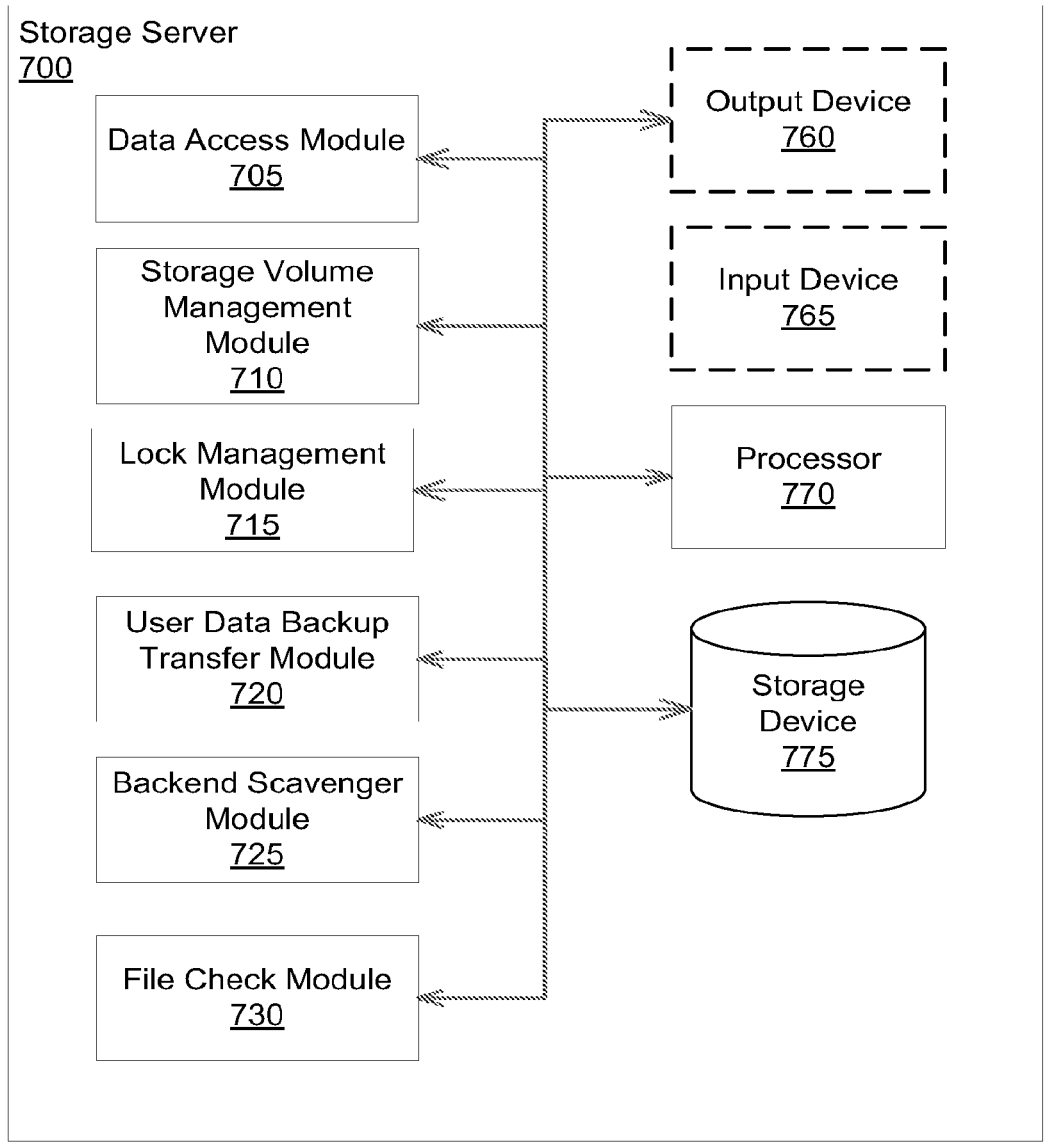
FIG. 7 is a block diagram illustrating an exemplary storage server, according to one exemplary embodiment.

FIG. 7 illustrates an exemplary storage server 700. The storage server 700 includes a data access module 705, a storage volume management module 710, a lock management module 715, a user data backup transfer module 720, a backend scavenger module 725, a file check module 730, an output device 760, an input device 765, a processor 770, and a storage device 775. The modules and/or devices can be hardware and/or software. The modules and/or devices illustrated in the storage server 700 can, for example, utilize the processor 770 to execute computer executable instructions and/or include a processor to execute computer executable instructions (e.g., an encryption processing unit, a field programmable gate array processing unit, etc.). It should be understood that the storage server 700 can include, for example, other modules, devices, and/or processors known in the art and/or varieties of the illustrated modules, devices, and/or processors. It should be understood that the modules and/or devices illustrated in the storage server 700 can be located within the storage server 700 and/or connected to the storage server 700 (e.g., directly, indirectly, etc.), but outside of the physical components of the management server (e.g., personal computer, mobile device, etc.).

The data access module 705 accesses data stored on the storage server 700. The storage volume management module 710 manages user data storages on a storages volume, a logical data site and/or data center.

The lock management module 715 manages locks for locking user data during transfer of user data, maintenance, etc. In some embodiments, the lock management module 715 can manage different types of locks, including a copy lock protecting file copying, an exclusive lock protecting user data from any access to user data, a scavenger lock protecting for read and occasional deletion of expired or corrupt files, a lock protecting user data for reading and writing, a read lock protecting user data for reading, and/or any other type of computer locking mechanism. In some embodiments, the locks can be local to a storage volume, storage server, or logical data site, etc.

The user data backup transfer module 720 manages transfer of user data backup between logical data sites and/or data centers. In some embodiments, the user data backup transfer module 720 transfers user data backup from a source logical data site to a destination logical data site which are located in two different data centers.

The backend scavenger module 725 deletes files no longer required by client for backup. In some embodiments, the client device determines when to purge unwanted files, and updates the backup status files accordingly. Using the updated backup status files, the backend scavenger module 725 deletes files from storage volumes. The backend scavenger module 725 purges data for expired computers, deletes obsolete backup files, requests resend of missing files, performs server file integrity checks, aggregates client log files, aggregates client log files, gathers server file statistics to logs and database, and/or manages free space in the file system (e.g., NTFS, proprietary file system).

The file check module 730 deletes invalid files (e.g., expired files, suspended files, etc.). The file check module 730 verifies integrity of server files, gathers computer parameters from database, records activity to logs and database, and/or reads storage volume configurations from database, etc. In some embodiments, the file check module 730 moves invalid files to a predetermined folder on each storage volume, and the backend scavenger module 725 performs the actual deletion of the invalid files. In other embodiments, using a proprietary file system, the file check module 730 marks the invalid files for purging, and the file system internally manages the deletion of files marked for purging.

The output device 760 outputs information and/or data associated with the storage server 700 (e.g., information to a printer (not shown), information to a speaker, etc.). The input device 765 receives information associated with the storage server 700 (e.g., instructions from a user, instructions from a computing device, etc.) from a user (not shown) and/or a computing system (not shown). The input device 765 can include, for example, a keyboard, a scanner, an enrollment device, a scale, etc.

The processor 770 executes the operating system and/or any other computer executable instructions for the management server (e.g., executes applications, etc.). The storage server 700 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 775 stores the files, user preferences, backup sets, access information, an operating system and/or any other data associated with the storage server 700. The storage device can include a plurality of storage devices. The storage device 775 can include, for example, long-term storage (e.g., a hard drive, a tape storage device, flash memory, etc.), short-term storage (e.g., a random access memory, a graphics memory, etc.), and/or any other type of computer readable storage.

Although FIG. 7 illustrates the exemplary storage server 700, any of the management servers described herein (e.g., site management server) can include the components and functionality described with respect to the storage server 700.

Figure 8:
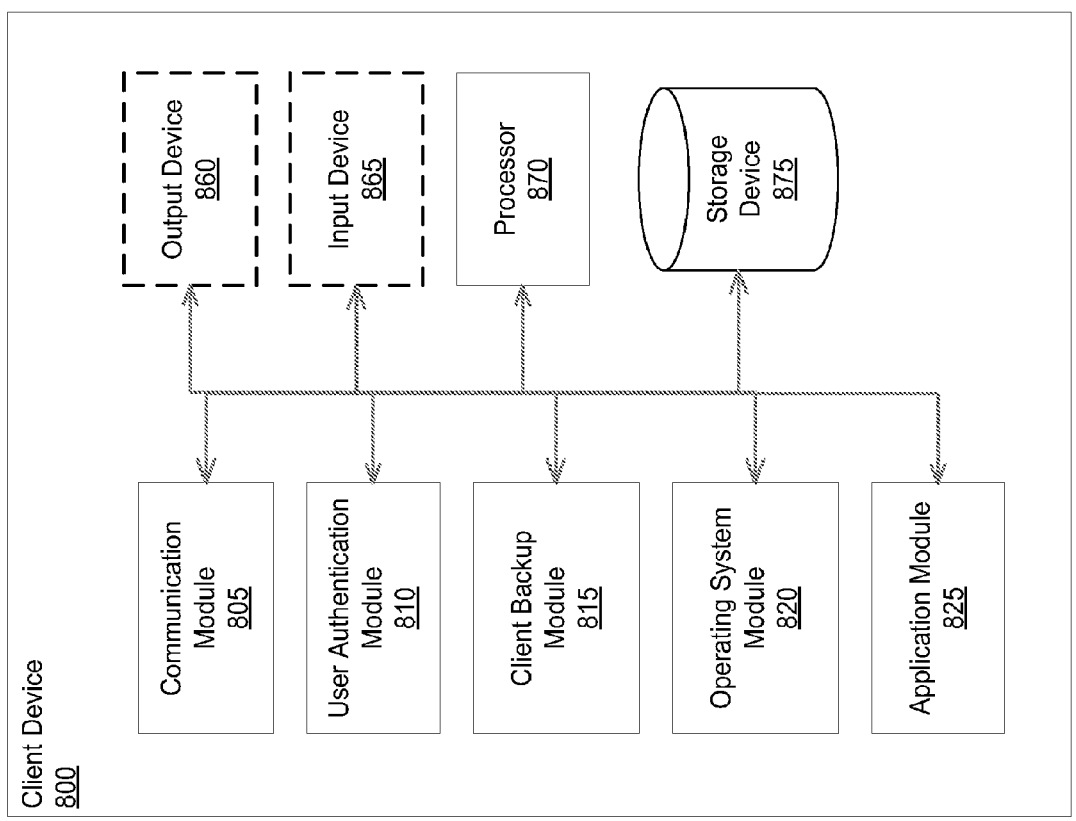
FIG. 8 is a block diagram illustrating an exemplary client device, according to one exemplary embodiment.

FIG. 8 illustrates an exemplary client device 800. The client device 800 includes a communication module 805, a user authentication module 810, a client backup module 815, an operating system module 820, an application module 825, an output device 860, an input device 865, a processor 870, and a storage device 875. The modules and/or devices can be hardware and/or software. The modules and/or devices illustrated in the client device can, for example, utilize the processor to execute computer executable instructions and/or include a processor to execute computer executable instructions (e.g., an encryption processing unit, a field programmable gate array processing unit, etc.). It should be understood that the client device 800 can include, for example, other modules, devices, and/or processors known in the art and/or varieties of the illustrated modules, devices, and/or processors. It should be understood that the modules and/or devices illustrated in the client device 800 can be located within the client device 800 and/or connected to the client device 800 (e.g., directly, indirectly, etc.), but outside of the physical components of the client device 800 (e.g., personal computer, mobile device, etc.).

The communication module 805 communicates data and/or information to/from the client device 800. The user authentication module 810 authenticates users for the client device 800 and/or the client backup module. The client backup module 815 backs-up, restores and/or identifies user data for backup and restoration. The operating system module 820 operates an operating system on the client device 800. The application module 825 operates one or more applications on the client device 800.

The output device 860 outputs information and/or data associated with the client device 800 (e.g., information to a printer (not shown), information to a speaker, etc.). The input device 865 receives information associated with the client device (e.g., instructions from a user, instructions from a computing device, etc.) from a user (not shown) and/or a computing system (not shown). The input device 865 can include, for example, a keyboard, a scanner, an enrollment device, a scale, etc.

The processor 870 executes the operating system and/or any other computer executable instructions for the client device (e.g., executes applications, etc.). The client device 800 can include random access memory (not shown). The random access memory can temporarily store the operating system, the instructions, and/or any other data associated with the client device. The random access memory can include one or more levels of memory storage (e.g., processor register, storage disk cache, main memory, etc.).

The storage device 875 stores the files, user preferences, backup sets, access information, an operating system and/or any other data associated with the management server (e.g., site management server, data center management server, etc.). The storage device 875 can include a plurality of storage devices. The storage device 875 can include, for example, long-term storage (e.g., a hard drive, a tape storage device, flash memory, etc.), short-term storage (e.g., a random access memory, a graphics memory, etc.), and/or any other type of computer readable storage.

Figure 9A:
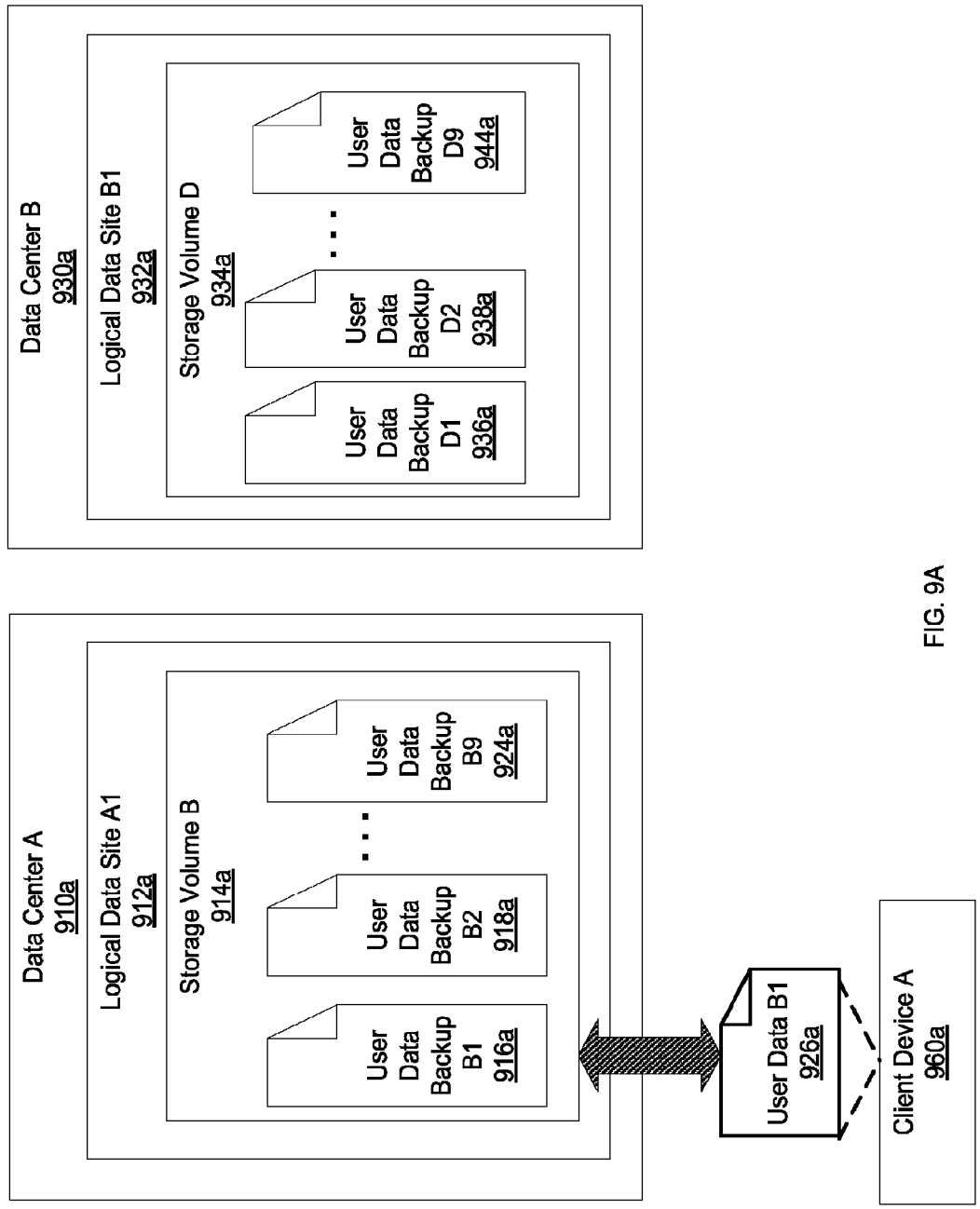
FIGS. 9A-9D are block diagrams illustrating transfer of user data between data sites, according to one exemplary embodiment.

FIG. 9A illustrates exemplary data center A 910*a* and data center B 930*a*. The data center A 910*a* includes a logical data site A1 912*a*. The logical data site A1 912*a* includes a storage volume B 914*a* storing user data backup B1 916*a*, B2 918*a* through B9 924*a*. The user data B1 926*a* stored on the client device A 960*a* is backed up to user data backup B1 916*a* on the storage volume B 914*a* on the logical data site A1 912*a* in the data center A 910*a*. In this embodiment, user data backup B1 916*a* is advantageously stored on a single storage volume 914*a* on a single logical data site 912*a* in a data center 910*a*, thereby simplifying administration and maintenance of the user data backup B1 916*a* by preserving the locality of user data backup in one volume.

As illustrated in FIG. 9A, the data center B 930*a* includes a logical data site B1 932*a*. The logical data site B1 932*a* includes a storage volume D 934*a*. The storage volume D 934*a* includes user data backups D1 936*a* through D9 944*a*. The user data backups D1 936*a* through D9 944*a* correspond to user data stored on various client devices.

Figure 9B:
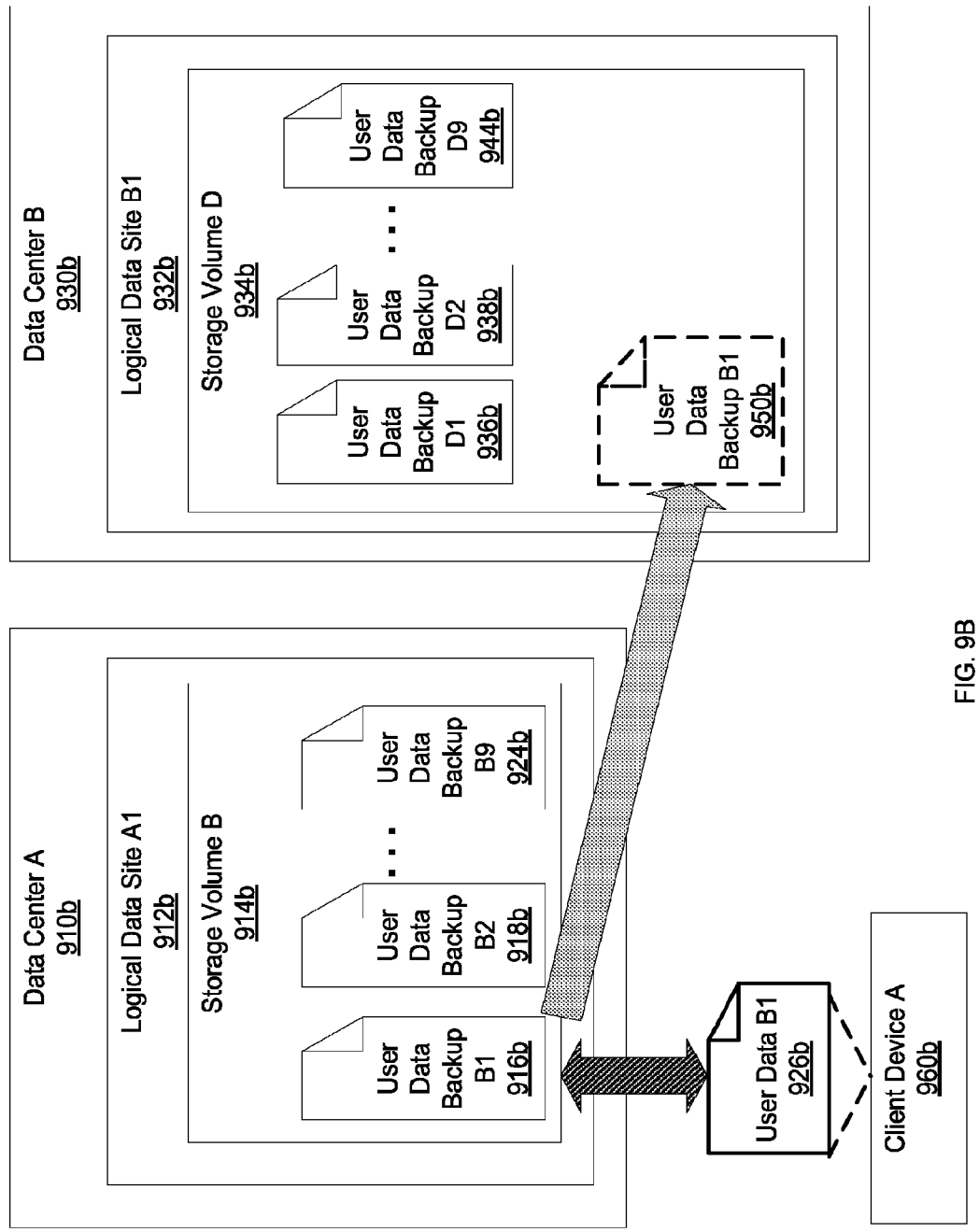

FIG. 9B illustrates a data center A 910*b* and a data center B 930*b* during transfer of user data backup B1 916*b* from the data center A 910*b* to the data center B 930*b*. As illustrated in FIG. 9B, a storage volume B 914*b* includes user data backup B1 916*b*, B2 918*b* through B9 924*b* and storage volume D 934*b* includes user data backups D1 936*b*, D2 938*b* through D9 944*b*. The storage volume D 934*b* includes part or all of the user data backup B1 916*b* as user data backup B1 950*b*. The user data backup B1 950*b* can include all or some data from user data backup B1 916*b*.

As illustrated in FIG. 9B, during the transfer of user data backup B1 916*b*, the client device A 960*b* can be connected to the storage volume B 814*b* in the logical data site A1 912*b* in the data center A 910*b*. In some embodiments, the client device A 860*b* can continue backing up user data to data center A 910*b*. In some embodiments, the client device A 860*b* can restore user data from data center A 910*b* during the transfer of user data backup B1 926*b*. In other embodiments, various backend processes (e.g., backup, restore, identification, etc.) can be suspended while the user data backup B1 926*b* is being transferred from data center A 910*b* to data center B 930*b*. In other embodiments, the backup and restore processes are suspended once the transfer of the user data backup B1 916*b* begins. In some embodiments, the backup and restore processes are suspended when the transfer of the connection between the client device A 960*b* and the storage volume D 934*b* begins.

In some embodiments, there can be a single destination logical data site for any source logical data site. In these embodiments, logical data site A1 912*b* can only transfer user data backups to logical data site B1 932*b*. In other embodiments, a source logical data site can transfer user data backups to multiple destination logical data sites. In other embodiments, a destination logical data site can accommodate multiple source logical data sites. In some embodiments, a logical data site can be both a source and a destination logical data site with respect to the transfer of different user data backups.

In some embodiments, there can be a single destination data center for any source data center. In these embodiments, data center A 910*b* can only transfer user data backups to data center B 930*b*. In other embodiments, a source data center can transfer user data backups to multiple destination data centers (e.g., selected based on predetermined criteria, selected based on dynamically generated criteria, etc.). In other embodiments, a destination data center can accommodate multiple source data centers. In some embodiments, a data center can be both a source and a destination data center with respect to the transfer of different user data backups.

Figure 9C:
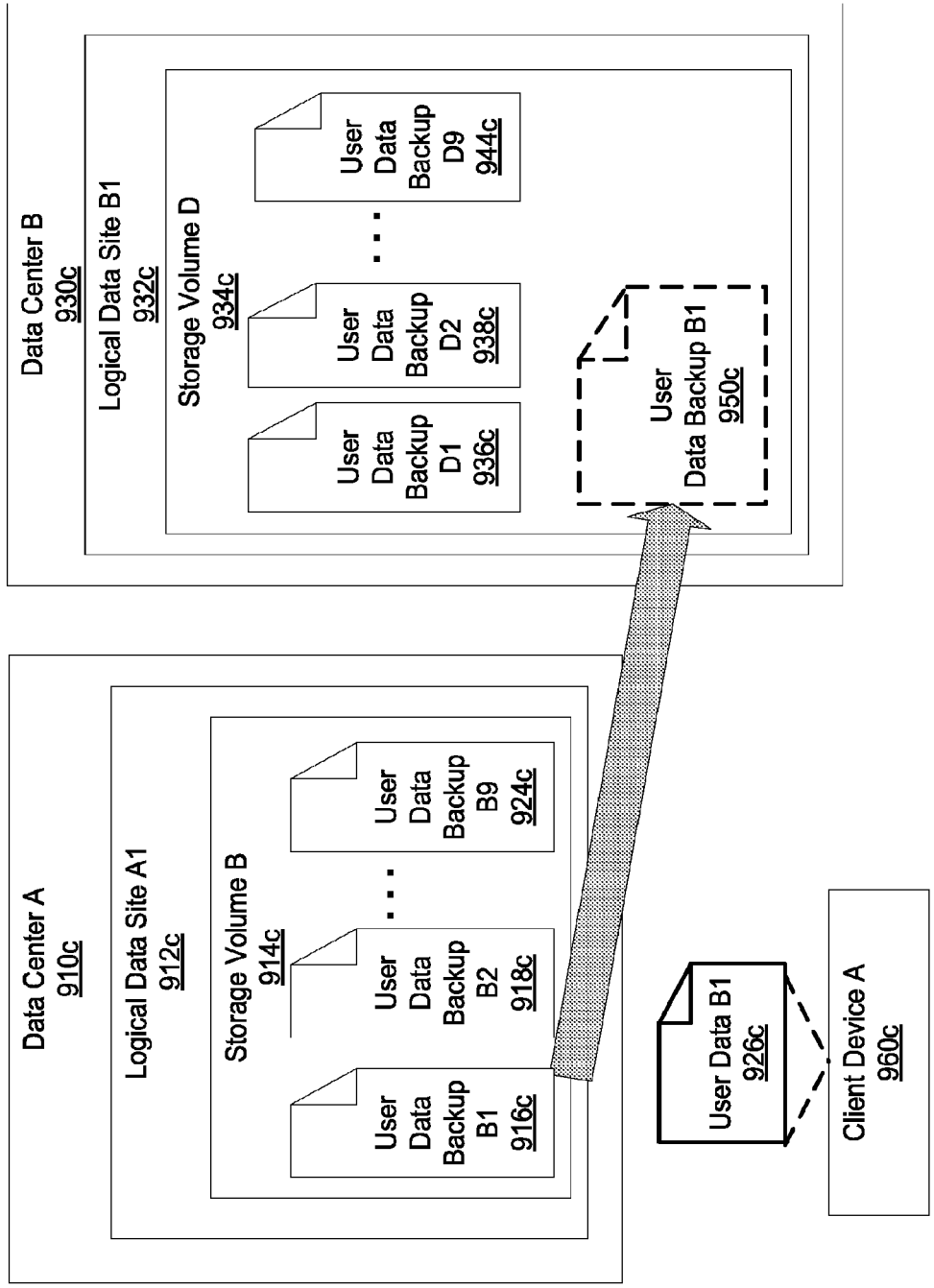

FIG. 9C illustrates that during transfer of user data backup B1 916*c*, client device A 960*c* can be disconnected from data centers 910*c* and 930*c*. At this time, client device A 960*c* cannot perform backup or restore of user data backup B1 916*c*. In some embodiments, client device A 960*c* gets disconnected from data center A 910*c* only when the transfer of user data backup B1 916*c* is completed. In other embodiments, client device A 960*c* is disconnected from data center A 910*c* before the transfer of user data backup B1 916*c* begins.

In some embodiments, the lock management module 715 suspends client sessions in progress with a communication server during the transfer of user data. In other embodiments, the lock management module 715 suspends client sessions in progress with the communication server during confirmation step (1230).

Figure 9D:
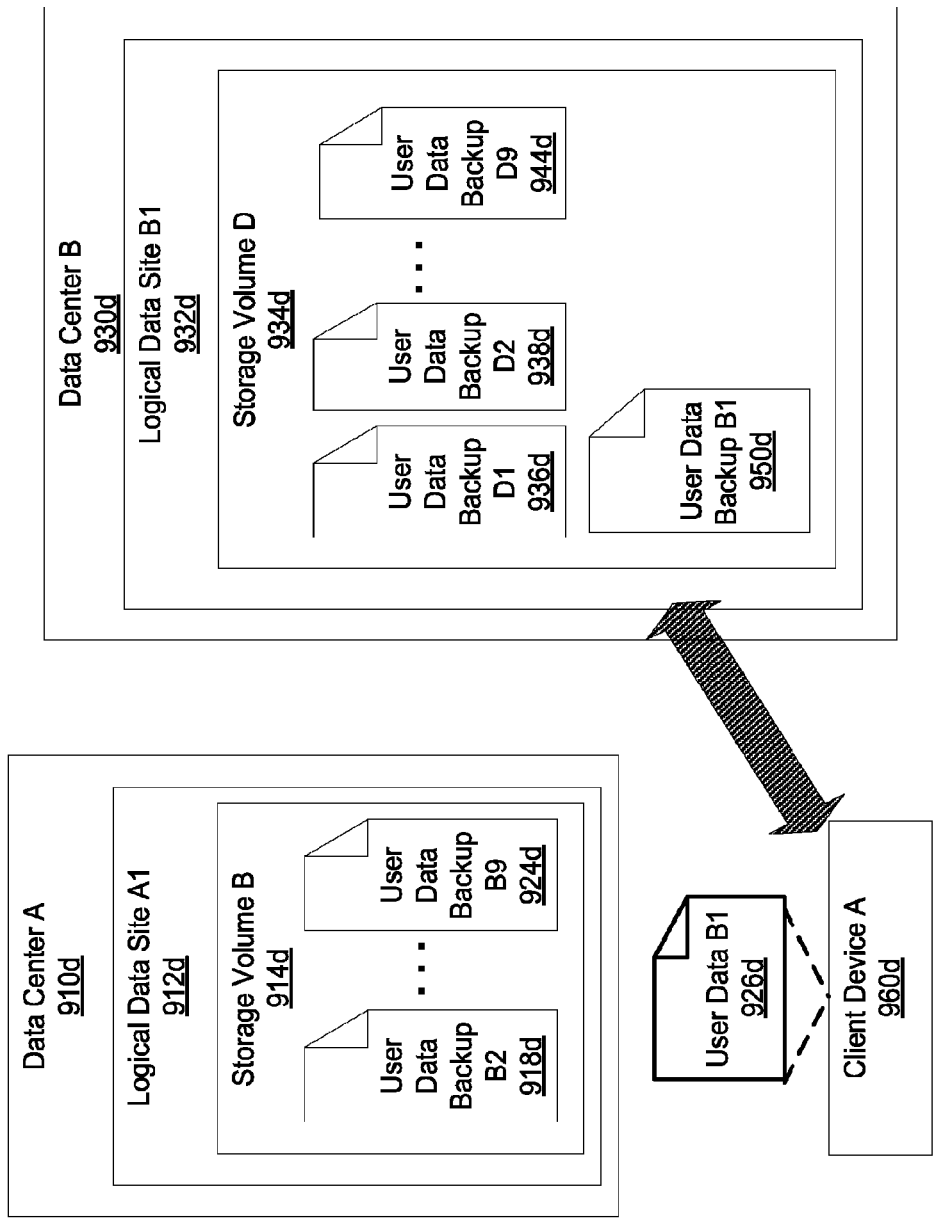

FIG. 9D illustrates client device A 960*d*, data center A 910*d*, and data center B 930*d*, after the transfer of backup of user data B1 950*d* to the storage volume D 934*d* is completed. As illustrated, user data backup B1 950*d* is stored in storage volume D 934*d* in data center B 930*d*. In some embodiments, the client device communication module 805 reconnects with the site management server communication module 605 in logical data site A1 912*d*, which will redirect the client communication module 805 to a site management server in logical data site B1 932*d*. In some embodiments, a communication server redirects the client device to the site management server in the logical data site B1 932*d*. Client device A 960*d* is connected to the data center B 930*d* for backup and restoring of the user data B1 950*d*. As shown in FIG. 8D, the storage volume B 914*d* in the data center A 910*d* does not include backup of the user data B1 950*d*. In some embodiments, the backup of user data B1 950*d* stored in the storage volume B 914*d* can be deleted from the storage volume B 914*d* as soon as the process of transferring backup of user data B1 926*d* is completed. In other embodiments, the backup of user data B1 926*d* stored in the storage volume B 914*d* can be marked for purging, and deleted as determined by storage volume management module 710 of FIG. 7.

As illustrated in Table 1, a data center A1 can include two logical data sites, where logical data site S180 includes storage volumes V32 and V33, and logical data site 181 includes storage volume V34. Data center A2 includes logical data sites S184 and S185, where the logical data site S184 includes storage volume V39 and logical data site V185 includes storage volume V40. As illustrated in Table 1, data center A1 stores a total of 6,060,476 MB of user data backup while data center A2 stores a total of 150,818 MB of user data backup. In this example, to relieve space pressure on data center A1, some of the user data stored in data center A1 may be moved to data center A2. For example, it can be desirable for data center A1 to store under 4,000,000 MB of user data. As a result, as illustrated in Table 2, user data backed up from client devices D167529 and D174321 can be marked for transfer from data center A1 to data center A2.

TABLE 1

Exemplary Data Centers Storing User Data Backup Before Transfer

| Data Center | Logical Data Site | Storage Volume | Client Device | Total Size MB |
|---|---|---|---|---|
| A1 | S180 | V32 | D148965 | 120,837 |
| A1 | S180 | V32 | D150732 | 1,007,383 |
| A1 | S180 | V33 | D123987 | 129,311 |
| A1 | S180 | V33 | D111289 | 837,271 |
| A1 | S180 | V33 | D167529 | 1,282,277 |
| A1 | S180 | V33 | D174321 | 927,183 |
| A1 | S181 | V34 | D176847 | 432,928 |
| A1 | S181 | V34 | D186726 | 1,323,286 |
| A2 | S184 | V39 | D198765 | 23,986 |
| A2 | S185 | V40 | D185432 | 126,832 |

TABLE 2

Exemplary User Data Backup Before Marked for Transfer

| Data Center | Logical Data Site | Storage Volume | Client Device | Total Size MB | Transfer |
|---|---|---|---|---|---|
| A1 | S180 | V32 | D148965 | 120,837 | |
| A1 | S180 | V32 | D150732 | 1,007,383 | |
| A1 | S180 | V33 | D123987 | 129,311 | |
| A1 | S180 | V33 | D111289 | 837,271 | |
| A1 | S180 | V33 | D167529 | 1,282,277 | Marked |
| A1 | S180 | V33 | D174321 | 927,183 | Marked |
| A1 | S181 | V34 | D176847 | 432,928 | |
| A1 | S181 | V34 | D186726 | 1,323,286 | |
| A2 | S183 | V39 | D198765 | 23,986 | |
| A2 | S185 | V40 | D185432 | 126,832 | |

As illustrated in Table 3, user data backup for client devices D167529 and D174321 is transferred to logical data site S184 in data center A2 utilizing the techniques as described herein. As a result of this transfer, the total amount of user data backup stored in data center A1 is 3,851,016 MB while the total amount of user data backup stored in data center A2 is 2,360,278.

TABLE 3

Exemplary Data Centers Storing User Data Backup After Transfer

| Data Center | Logical Data Site | Storage Volume | Client Device | Total Size MB |
|---|---|---|---|---|
| A1 | S180 | V32 | D148965 | 120,837 |
| A1 | S180 | V32 | D150732 | 1,007,383 |
| A1 | S180 | V33 | D123987 | 129,311 |
| A1 | S180 | V33 | D111289 | 837,271 |
| A1 | S181 | V34 | D176847 | 432,928 |
| A1 | S181 | V34 | D186726 | 1,323,286 |
| A2 | S183 | V39 | D198765 | 23,986 |
| A2 | S185 | V40 | D185432 | 126,832 |
| A2 | S185 | V40 | D167529 | 1,282,277 |
| A2 | S185 | V40 | D174321 | 927,183 |

Figure 10:
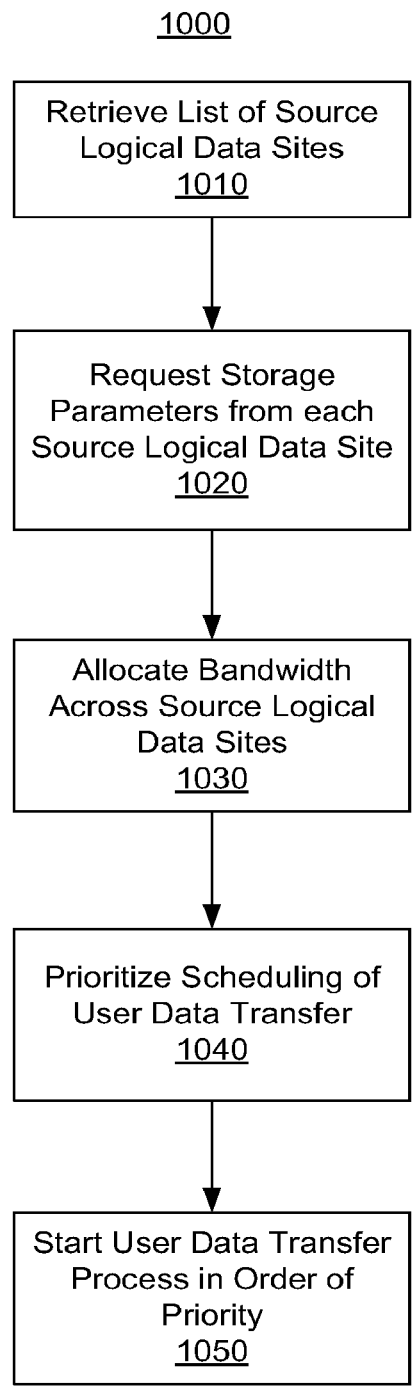
FIG. 10 is a flowchart illustrating scheduling a transfer of user data between data sites, according to one exemplary embodiment.

In FIG. 10, a flow chart 1000 relating to scheduling transfer of user data backups between two logical data sites located on two different data centers is shown, according to an exemplary embodiment, utilizing the site management server 600 of FIG. 6. The destination site scheduler module 625 retrieves (1010) from a database or other storage device a list of one or more logical data sites that the destination site can provide space relief for. The destination site scheduler module 625 requests (1020) values for storage parameters from each source logical data site. Table 4 illustrates exemplary storage parameters for logical data sites 180, 181, and 196, located in data center 1. As illustrated in Table 4, the storage parameters associated with a logical data site can include percentage of available free space, memory usage, processing capacity, and/or any other type of parameters associated with a storage server.

TABLE 4

Exemplary Storage Parameters

| Data Center | Logical Data Site | Available Free Space % | Memory Usage (GB) | Processing Capacity (GHz) |
|---|---|---|---|---|
| 1 | 180 | 2% | 2.5/4.0 GB | 3 GHz |
| 1 | 181 | 10% | 1.9/4.0 GB | 3.5 GHz |
| 1 | 196 | 25% | 3.0/6.0 GB | 4 GHz |

In some embodiments, storage parameters can include the total amount of free or unclaimed space on the source logical data site. In some embodiments, when the amount of free space or unclaimed space in a source logical data site is below a predetermined minimum free space parameter (e.g., 2%, 5%, etc.), the transfer of data can be scheduled regardless of time of day. When the amount of free space or unclaimed space in the source logical data site is above the predetermined minimum free space parameter, the transfer of user data to a destination logical site can be performed between predetermined time periods (e.g. between 1:00 am and 4:00 am every night, midnight and 2:00 am every Sunday night, etc.). For example, the minimum free space parameter can be 2% or any other predetermined value. In some embodiments, the storage parameters can include volume purged space, bandwidth usage, storage system performance characteristics (e.g., I/O bandwidth, network bandwidth within a site), etc. The scheduling of transfer of user data can be based on any combination of the storage parameters described herein.

The destination site scheduler module 625 allocates (1030) available network bandwidth across source sites. The destination site scheduler module 625 can allocate destination logical data site uplink network bandwidth across source logical data sites. In some embodiments, the destination site scheduler module 625 first allocates network bandwidth to source logical data sites with the lowest free or unclaimed space, and then equally among source logical data sites once low free or unclaimed space levels are equalized. The destination site scheduler module 625 can take into account a threshold for network bandwidth, thereby avoiding additional bandwidth costs. For example, as illustrated in Table 5, the destination site scheduler module 625 can allocate 50 Megabits per second ("MBps") to logical data site S180, 15 MBps to logical data site S181, and 5 MBps to logical data site S196. As illustrated, a logical data site with the least available free space was allocated the most bandwidth.

TABLE 5

Exemplary Bandwidth Allocation.

| Data Center | Logical Data Site | Available Free Space % | Bandwidth |
|---|---|---|---|
| A1 | S180 | 2% | 50 MBps |
| A1 | S181 | 10% | 15 MBps |
| A1 | S196 | 25% | 5 MBps |

The destination site scheduler module 625 prioritizes (1040) scheduling of user data transfer from one or more source logical data sites based on the values of the storage parameters and/or network bandwidth availability (e.g., first priority for available free space less than 5%, second priority for available free space between 6-10%, etc.). In some embodiments, if the percentage of free or unclaimed space in a source logical data site is below a predetermined minimum free or unclaimed space percentage, then the source logical data site can receive a higher priority. The destination site scheduler module 625 starts (1050) the user data transfer process in order of priority determined in step 940. In some embodiments, the destination site scheduler module 625 can invoke a scheduler on the source logical data sites. For example, the destination site scheduler module 625 can make a remote component object model ("COM") call or remote procedure call ("RPC") to the source site scheduler.

In some embodiments, the destination site scheduler module 625 allows for overlapping transfers of user data from several logical data sites. In other embodiments, the destination site scheduler module 625 allows for transfer of data from a single logical data site at any given time.

Figure 11:
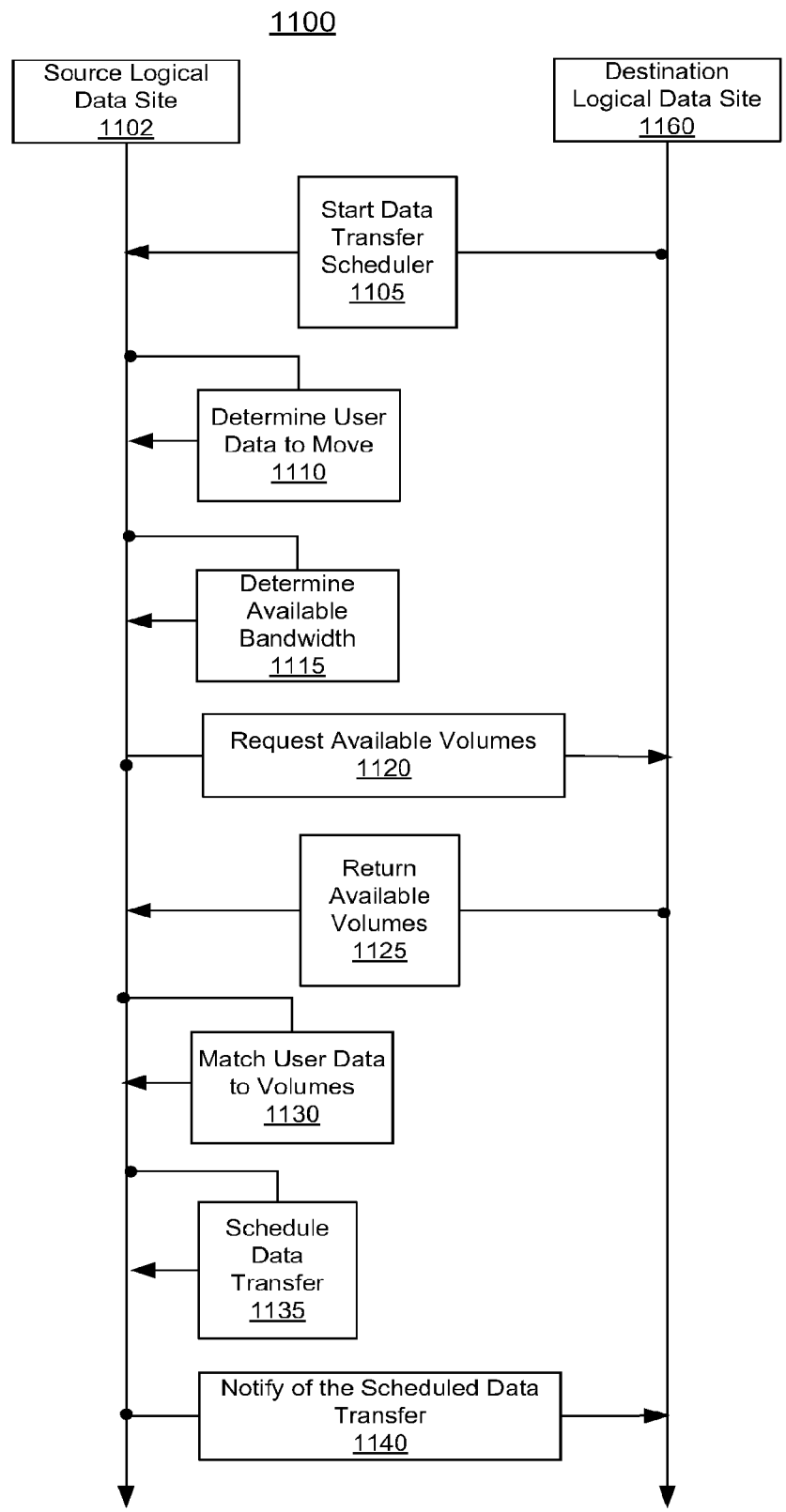
FIG. 11 is a sequence diagram illustrating scheduling a transfer of user data between data sites, according to one exemplary embodiment.

In FIG. 11, a flow chart 1100 relating to scheduling transfer of user data backups between a source logical data site 1102 and a destination logical data site 1160 located on two different data centers is shown, according to an exemplary embodiment, utilizing the site management server 600 of FIG. 6. The destination site scheduler 625 module starts (1105) a data transfer scheduler located on the source logical data site. In some embodiments, the destination logical data site 1160 advantageously initiates scheduling to it, to enable synchronization between inter-site and intra-site transfers to its storage volumes. In these embodiments, the destination logical data site 1160 schedules its own intra-site transfers to effect rebalancing of its storage servers and performs this at a time when the source logical data site 1102 is not scheduling inter-site transfers.

The source site scheduler module 630 determines (1110) what user data backup to move. In some embodiments, user data backup represents backup of user data stored on one or more client devices associated with one or more users. In some embodiments, criteria for choosing user data most advantageous to move can include backup size including pending data that has not been moved from a client device to the source logical data site 1102. In some embodiments, the user data may be a list of user data associated with client devices, ordered such that the highest priority is given to low or distressed volumes on which user data is stored.

The source site scheduler module 630 determines (1115) network bandwidth available for transferring user data between the source logical data site 1102 and the destination logical data site 1160. In some embodiments, the source site scheduler module 630 determines available network bandwidth by analyzing one or more network bandwidth parameters. For example, one of the network bandwidth parameters can include the bandwidth allocated to the source logical data site 1102 by the destination site scheduler module 625 (e.g., 50 MBps). In some embodiments, the network bandwidth parameters are predefined in terms of downlink network bandwidth (e.g., 10 MBps downlink). In other embodiments, the network bandwidth parameters are predefined in terms of both downlink and uplink network bandwidth (e.g., 5 MBps downlink/15 MBps uplink).

In some embodiments, the network bandwidth parameters can include network bandwidth quota for the destination logical data site 1160 (e.g., maximum kilobits per second (kbps) allowed to the site during transfer of data, maximum kbps allowed from the site during the transfer of data, etc.). In other embodiments, the network bandwidth parameters can include a maximum network bandwidth allowed for any one transfer job between logical data sites (e.g., 25 MBps). In other embodiments, the network bandwidth parameters can include maximum network bandwidth allowed from any one server during the transfer of user data between logical data sites. In other embodiments, the network bandwidth parameters can include maximum network bandwidth allowed to any one server during the transfer of user data between logical data sites. In other embodiments, the network bandwidth parameters can include maximum network bandwidth allowed to any one logical data site during the transfer of user data between logical data sites. The source site scheduler module 630 can determine the maximum number of transfer jobs that can be scheduled to the destination logical data site 1160 at any one time (e.g., four jobs per destination logical data site per hour, ten jobs per destination logical data site per transfer window—1:00 am to 4:00 am, etc.). The source site scheduler module 630 can utilize any combination of the network bandwidth parameters described above, or any other additional network bandwidth parameters. In an exemplary embodiment, the source site scheduler module 630 can utilize predetermined kbps per transfer job, backup and/or restore activity, maximum kbps that can be read from a storage server, maximum kbps that can be written to a single storage server, and/or maximum kbps allocated for transfer jobs to a particular site, in combination with any other additional parameters. Values for one or more network bandwidth parameters can be in part derived from one or more databases storing historical usage of network bandwidth.

The source site scheduler module 630 requests (1120) available volumes from the destination logical data site 1160. The storage volume management module 620 computes available or unclaimed space for each volume in the destination logical data site 1160. In some embodiments, the determination of available volumes is resilient to volume failures (e.g., volume is taken offline for operational reasons, volume fails, hard-drive failure, etc.) by checking whether each volume is online or running. In other embodiments, storage volume management module 620 can reduce the available space for each volume by already scheduled transfers of user data to the destination logical data site 1160. In other embodiments, the storage volume management module 620 can reduce the available space for each volume by the size of pending backup of user data (e.g., user data scheduled for backup but not yet transferred from client device to data site). In one embodiment, a default volume on the destination logical data site 1160 can be used for transferring user data backups.

In some embodiments, volumes in the destination logical data site 1160 can be stored on one or more storage servers. In some embodiments, the storage volume management module 620 computes network bandwidth for each storage server in the destination logical data site 1160. In some embodiments, the storage volume management module 620 generates a list of volumes, ordered by most available space, and then by network bandwidth. In other embodiments, the generated list of volumes is ordered by most available space. The storage volume management module 620 returns (1125) the ordered list of available volumes back to the source logical data site 1102.

The source site scheduler module 630 matches (1130) or allocates user data to move to available volumes on the destination logical data site 1160. In some embodiments, the source site scheduler module 630 fills up each available volume on the destination logical data site 1160 with user data. The source site scheduler module 630 takes into account available space on each volume, and/or network bandwidth parameters associated with the destination logical data site 1160. In some embodiments, network bandwidth and volume capacity is examined on both source and destination logical data sites.

The source site scheduler module 630 schedules (1135) data transfer based on one or more schedule parameters. In some embodiments, the one or more schedule parameters include bandwidth parameters, scheduled date parameters, scheduled time parameters, and/or any other type of parameters associated with the storage and/or restoration of user data. For example, scheduled date parameters can specify that scheduling of data transfer is permitted on certain days only (e.g., Saturdays, holidays, last Friday of each month, etc.). In some embodiments, according to scheduled time parameters, transfer of user data backup between logical data sites is permitted between predetermined time periods (e.g., between 1:00 am and 4:00 am, midnight and 2:00 am, etc.). For example, as illustrated in Table 6, uplink and downlink network bandwidth utilization is lowest between 1:00 am and 4:00 am. As a result, the source site scheduler module 630 can schedule transfer of user data from logical data site S180 between 1:00 am and 4:00 am. In these embodiments, the transfer of user data backups is advantageously performed when network bandwidth utilization is low (e.g., overnight, weekends, etc.) such that additional network bandwidth costs are not incurred during the transfer of data between data sites, thereby decreasing the cost of the transfer of the user data and increasing the effective usage of the network bandwidth.

TABLE 6

Exemplary Historic Uplink and Downlink Network Utilization

| Data Center | Logical Data Site | Time Range | Uplink Bandwidth % | Downlink Bandwidth % |
|---|---|---|---|---|
| A1 | S180 | 6:00 pm-7:00 pm | 64% | 85% |
| A1 | S180 | 7:00 pm-8:00 pm | 58% | 76% |
| A1 | S180 | 8:00 pm-9:00 pm | 40% | 50% |
| A1 | S180 | 10:00 pm-11:00 pm | 34% | 45% |
| A1 | S180 | 11:00:00 PM-midnight | 27% | 35% |
| A1 | S180 | midnight-1:00 am | 20% | 24% |

TABLE 6-continued

Exemplary Historic Uplink and Downlink Network Utilization

| Data Center | Logical Data Site | Time Range | Uplink Bandwidth % | Downlink Bandwidth % |
|---|---|---|---|---|
| A1 | S180 | 1:00 am-2:00 am | 15% | 17% |
| A1 | S180 | 2:00 am-3:00 am | 15% | 16% |
| A1 | S180 | 3:00 am-4:00 am | 13% | 14% |
| A1 | S180 | 4:00 am-5:00 am | 21% | 23% |
| A1 | S180 | 5:00 am-6:00 am | 32% | 38% |

In some embodiments, the source site scheduler module 630 schedules a separate job for each user data associated with a separate client device. In other embodiments, the source site scheduler module 630 schedules a single job for transferring all user data as determined in step 1010. In other embodiments, the source site scheduler module 630 can schedule transfer of user data for multiple client devices into several transfer jobs. The source site scheduler module 630 notifies (1140) the destination logical data site 1160 of the scheduled data transfer (e.g., notification through email, RPC, COM, ftp, etc.). In some embodiments, the source site scheduler module 630 updates one or more storage databases with the scheduled data transfer jobs. The one or more databases include data regarding scheduled transfer jobs which are stored on the source logical data site, the destination logical data site, and/or another server used by the destination logical data site and the source logical data site.

In some embodiments, the source logical data site 1102 can initiate the scheduling of transfer of user data. In some embodiments, the source site scheduler module 630 of FIG. 6 monitors available space on the volumes in the source logical data site 1102, and initiates scheduling of user data transferring once the available space is below a threshold minimum available space. In other embodiments, if the available space in the source logical data site falls below a threshold minimum available space, the source site scheduler module 630 can schedule transfer of user data immediately. In other embodiments, the source site scheduler module 630 begins the transfer of data immediately.

Figure 12:
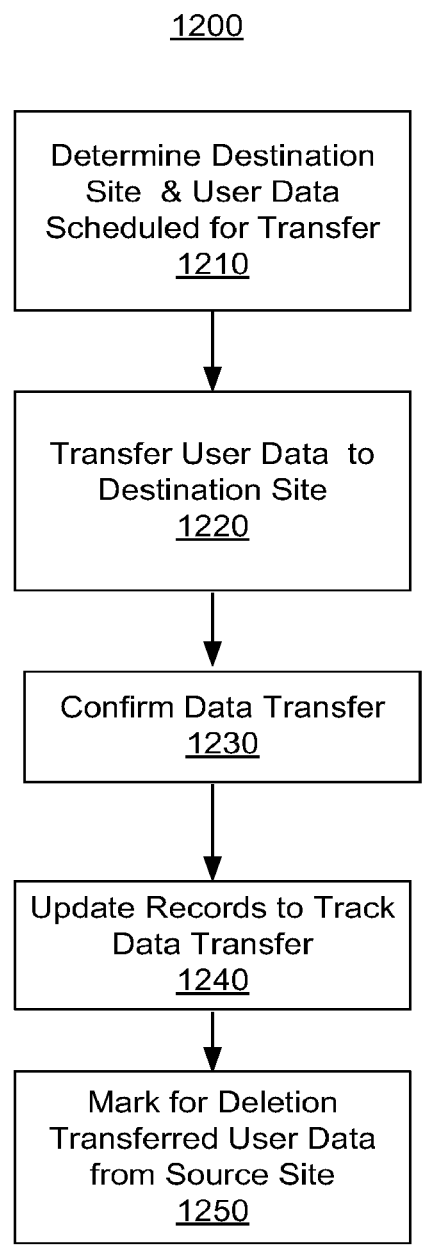
FIG. 12 is a flowchart illustrating a transfer of user data between data sites, according to one exemplary embodiment.

In FIG. 12, a flow chart 1200 relating to transferring user data backups from a source logical data site to a destination logical data site is shown, according to an exemplary embodiment, utilizing the site management server 600 of FIG. 6 and the storage server 700 of FIG. 7. The user data backup transfer module 720 determines (1210) destination logical data site to which to transfer data, as well as user data scheduled for transfer. In some embodiments, the data regarding the destination logical data site and identity of user data scheduled for transfer can be stored in one or more storage databases. The one or more databases can be located on the source logical data site, on the destination logical data site, and/or on a server utilized by both sites. The user data backup transfer module 720 transfers (1220) user data to the destination logical data site. In some embodiments, the user data backup transfer module 720 transfers one file at a time from the source logical data site to the destination logical data site. In other embodiments, the user data backup transfer module 720 transfers several files at a time. In other embodiments, the user data backup transfer module 720 compresses all files associated with a client device and transmits the compressed files to the destination logical data site. In some embodiments, backup processes are not suspended during the transfer of data.

The user data backup transfer module 720 confirms (1230) that all the data from user data scheduled for transfer was transferred to the destination logical data site. In some embodiments, the confirmation is performed by a file by file sweep of user data on the source logical data site and comparing the user data to the user data transferred to the destination logical data site. The user data backup transfer module 720 updates (1240) bookkeeping records to track user data transfer. In some embodiments, one or more databases are updated to reflect that the transferred user data is located on the destination logical data site, and not on the source logical data site. Client devices associated with the transferred user data can be pointed to the destination logical data site. The user data backup transfer module 720 marks (1250) for deletion transferred user data on the source logical data site. The storage volume management module 620 can delete the user data marked for deletion as determined by its user data deletion protocol. In some embodiments, the user data backup transfer module 720 can delete the transferred user data from the source logical data site immediately following the confirmation step (1230).

Figure 13:
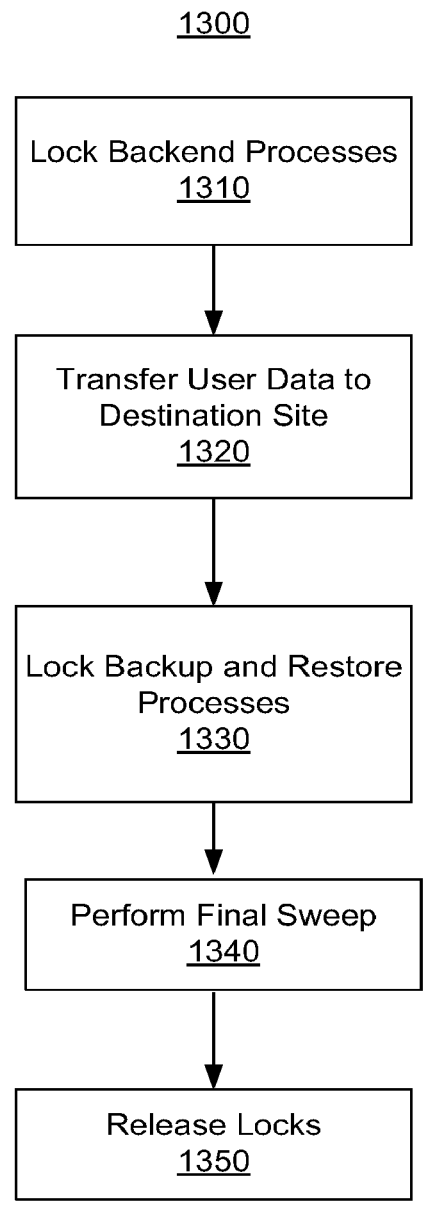
FIG. 13 is a flowchart illustrating a locking mechanism during a transfer of data, according to one exemplary embodiment.

In FIG. 13, a flow chart 1300 relating to a locking mechanism during transfer of user data backups from a source logical data site to a destination logical data site is shown, according to an exemplary embodiment, utilizing the site management server 600 of FIG. 6 and the storage server 700 of FIG. 7. In some embodiments, the lock management module 715 locks (1310) user data before the transfer of user data begins. As a result, one or more backend processes associated with the user data backed up from a client device are suspended. In some embodiments, the one or more of the backend processes perform purging data for expired client devices, scavenging files no longer required by client for backup, deleting obsolete backup files, requesting resend of missing files, checking file integrity, aggregating or accumulating client log files, and/or gathering server file statistics to databases and logs, etc. In other embodiments, backup and restore processes are not suspended during the initial transfer of user data.

The user data backup transfer module 720 transfers (1320) user data backup to the destination logical data site. After the user data backup is transferred, the lock management module 715 locks (1330) the user data backup being transferred. In some embodiments, the lock management module 715 updates one or more databases with a lock indicating that the user data that is being transferred is locked and that all the processes accessing the user data are to be suspended. In some embodiments, the lock management module 715 can suspend any client session in progress with a communication server.

In these embodiments, the user data backup being transferred is advantageously locked after the initial transfer of user data backup is completed to minimize disruption to backup and restore processes, and to prevent error and corruption of user data backup. In these embodiments, the client backup module 715 discovers the lock and suspends further backup and restore of user data until the lock is released. In other embodiments, the lock management module 715 updates one or more databases with a lock indicating that a volume from which user data is being transferred is locked and that all the processes accessing the volume are to be suspended. In other embodiments, the lock management module 715 transmits a notification to the client backup module 715 indicating that user data backup is locked.

While the backend processes are suspended, the user data backup transfer module 720 performs (1340) a final sweep, confirming that all the user data was transferred to the destination logical data site. For example, if during the initial transfer of user data, additional user data associated with the client device was backed up, this additional user data is transferred to the destination logical data site during step 1340. In some embodiments, steps 1330 and 1340 are performed during the step 1230.

Once the user data backup transfer module 720 confirms that all the user data from the source logical data site has been transferred to the destination logical data site, the lock management module 715 releases (1350) the locks. Before the locks are released and backend processes are resumed, the client device is pointed to the destination logical data site for future backup and restoring. In some embodiments, steps 1330, 1340, and 1350 are performed during the step 1230.

In some embodiments, the lock management module 715 updates the one or more databases indicating that the user data is no longer locked. In other embodiments, the lock management module 715 transmits a notification to the client backup module 815 indicating that the user data backup is no longer locked and that further backup and restoring is permitted. In some embodiments, the user data backup transfer module 720 updates bookkeeping records to track the user data transfer.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The communication networks can include, for example, packet-based networks and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a computer-readable medium. Computer-readable media is non-transitory in nature and includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for transferring client device data between data backup sites, comprising:
    selecting, based on a storage parameter, a subset of client device backup data for transferring from a source data backup site storing the client device backup data to a destination data backup site remote from the source data backup site, the client device backup data comprising data associated with one or more client devices separate from the source data backup site and destination data backup site;
    receiving a transfer parameter from the destination data backup site, the transfer parameter comprising an identification of a plurality of storage logical sites at the destination data backup site available for data storage;
    matching the selected subset of client device backup data to a storage logical site of the plurality of storage logical sites based on a parameter selected from a group consisting of the storage parameter, and the transfer parameter; and
    scheduling a transfer of the selected subset of client device backup data to the matched storage logical site based on a parameter selected from a group consisting of the storage parameter, the transfer parameter, and a schedule parameter.

2. The method of claim 1, further comprising transmitting a notification to the destination site, the notification comprising information associated with the scheduled data transfer.

3. The method of claim 1, further comprising updating a storage database based on the scheduled backup data transfer.

4. The method of claim 1, further comprising transferring the selected subset of client device backup data from the source data backup site to the destination data backup site based on the scheduled backup data transfer.

5. The method of claim 4, further comprising suspending a backend process associated with a client device of the one or more client devices associated with client device backup data in the selected subset before transferring client device backup data.

6. The method of claim 4, further comprising
    suspending a backend process associated with a client device of the one or more client devices associated with client device backup data in the selected subset after transferring backup data;
    determining whether all client device backup data for the client device transferred from the source backup data site to the destination backup data site; and
    resuming the backend process associated with the client device.

7. The method of claim 6, further comprising updating a storage database based on the transfer of backup data to the destination data backup site.

8. The method of claim 4, further comprising redirecting a client device of the one or more client devices associated with client device backup data in the selected subset to connect to the destination backup data site for accessing the transferred backup data.

9. The method of claim 1, wherein the storage parameter is a parameter selected from a group consisting of free space available on the source backup data site, memory usage on the source backup data site, and processing capacity on the source backup data site.

10. The method of claim 1, wherein the schedule parameter is a parameter selected from a group consisting of a network bandwidth parameter, a scheduled date parameter, and a scheduled time parameter.

11. The method of claim 10, wherein the network bandwidth parameter is a parameter selected from a group consisting of a network bandwidth quota for the destination data backup site, and a maximum network bandwidth parameter for a transfer of backup data between data sites.

12. A system for transferring client device data between data sites, the system comprising:
    a device, comprising a processor, a network interface, and a memory device, the processor executing a source site scheduler module and a user data backup transfer module;
    wherein the source site scheduler module is configured to
        select, based on a storage parameter, a subset of client device backup data stored in the memory device for transferring from a source data backup site storing the client device backup data to a destination data backup site remote from the source data backup site, the client device backup data comprising data associated with one or more client devices separate from the source data backup site and destination data backup site;
        receive via the network interface a transfer parameter from the destination data backup site, the transfer parameter comprising an identification of a plurality of storage logical sites at the destination data backup site available for data storage;
        match the selected subset of client device backup data to a storage logical site of the plurality of storage logical sites based on a parameter selected from a group consisting of the storage parameter, and the transfer parameter; and
        schedule a transfer of the selected subset of client device backup data to the matched storage logical site via the network interface based on a parameter selected from a group consisting of the storage parameter, the transfer parameter, and a schedule parameter; and
    wherein the user data backup transfer module is configured to transfer backup data from the source data backup site to the destination data backup site.

13. The system of claim 12, further comprising:
    a destination site scheduler module configured to:
        determine a source data backup site associated with a destination data backup site, and
        allocate network bandwidth to the source data backup site.

14. The system of claim 12, wherein the user data backup transfer module is further configured to transmit a notification to the destination site, the notification comprising information associated with the scheduled data transfer.

15. The system of claim 12, wherein the user data backup transfer module is further configured to update a storage database based on the scheduled backup data transfer.

16. The system of claim 12, wherein the user data backup transfer module is further configured to transfer the selected subset of client device backup data from the source data backup site to the destination data backup site based on the scheduled backup data transfer.

17. The system of claim 12, wherein the storage parameter is a parameter selected from a group consisting of free space available on the source backup data site, memory usage on the source backup data site, and processing capacity on the source backup data site.

18. The system of claim 12, wherein the schedule parameter is a parameter selected from a group consisting of a network bandwidth parameter, a scheduled date parameter, and a scheduled time parameter.

19. The system of claim 18, wherein the network bandwidth parameter is a parameter selected from a group consisting of a network bandwidth quota for the destination data backup site, and a maximum network bandwidth parameter for a transfer of backup data between data sites.

* * * * *